US010189987B2

(12) United States Patent
Nishioka et al.

(10) Patent No.: US 10,189,987 B2
(45) Date of Patent: Jan. 29, 2019

(54) PNEUMATIC TIRE

(71) Applicant: SUMITOMO RUBBER INDUSTRIES, LTD., Kobe-shi, Hyogo (JP)

(72) Inventors: Kazuyuki Nishioka, Kobe (JP); Kenichi Uesaka, Kobe (JP); Takahiro Kawachi, Kobe (JP); Masako Nakatani, Kobe (JP); Tatsuhiro Tanaka, Kobe (JP); Fumiya Kato, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 195 days.

(21) Appl. No.: 15/032,382

(22) PCT Filed: Oct. 27, 2014

(86) PCT No.: PCT/JP2014/078460
§ 371 (c)(1),
(2) Date: Apr. 27, 2016

(87) PCT Pub. No.: WO2015/076064
PCT Pub. Date: May 28, 2015

(65) Prior Publication Data
US 2016/0264772 A1    Sep. 15, 2016

(30) Foreign Application Priority Data

Nov. 25, 2013  (JP) ................. 2013-242997

(51) Int. Cl.
B60C 1/00 (2006.01)
C08K 9/06 (2006.01)
C08L 47/00 (2006.01)
C08C 19/25 (2006.01)
C08C 19/44 (2006.01)
C08C 19/22 (2006.01)
C08L 9/00 (2006.01)
C08F 236/10 (2006.01)

(52) U.S. Cl.
CPC ............ C08L 47/00 (2013.01); B60C 1/0016 (2013.01); C08C 19/22 (2013.01); C08C 19/25 (2013.01); C08C 19/44 (2013.01); C08K 9/06 (2013.01); C08L 9/00 (2013.01); C08F 236/10 (2013.01); C08L 2205/03 (2013.01); C08L 2205/035 (2013.01)

(58) Field of Classification Search
CPC ......... C09C 19/22; C09C 19/25; C09C 19/44; C08K 9/06; B60C 1/0016
See application file for complete search history.

(56) References Cited

U.S. PATENT DOCUMENTS

| | | | |
|---|---|---|---|
| 3,937,681 A | 2/1976 | Nordsiek | |
| 4,836,262 A | 6/1989 | Nishizawa et al. | |
| 5,087,668 A | 2/1992 | Standstrom et al. | |
| 5,189,109 A | 2/1993 | Imai et al. | |
| 6,147,178 A | 11/2000 | Nakamura et al. | |
| 6,294,624 B1 | 9/2001 | Inoue et al. | |
| 6,590,017 B1 | 7/2003 | Hergenrother et al. | |
| 9,181,413 B2 * | 11/2015 | Taguchi ............... | B60C 1/0016 |
| 2002/0011293 A1 | 1/2002 | Zanzig et al. | |
| 2004/0152845 A1 | 8/2004 | Oshima et al. | |
| 2004/0254301 A1 | 12/2004 | Tsukimawashi et al. | |
| 2005/0119399 A1 | 6/2005 | Nishioka et al. | |
| 2005/0209390 A1 | 9/2005 | Yagi et al. | |
| 2005/0272852 A1 | 12/2005 | Sandstrom et al. | |
| 2005/0277717 A1 | 12/2005 | Joshi et al. | |
| 2006/0173118 A1 | 8/2006 | Hochi et al. | |
| 2007/0078202 A1 | 4/2007 | Mihara et al. | |
| 2007/0123636 A1 | 5/2007 | Hattori et al. | |
| 2007/0149688 A1 | 6/2007 | Hochi | |
| 2007/0167557 A1 | 7/2007 | Dumke et al. | |
| 2007/0244236 A1 | 10/2007 | Nomura et al. | |

(Continued)

FOREIGN PATENT DOCUMENTS

| | | |
|---|---|---|
| CN | 1578790 A | 2/2005 |
| CN | 1670062 A | 9/2005 |

(Continued)

OTHER PUBLICATIONS

Machine translation of JP-2008-150436-A dated Jul. 3, 2008.
Machine translation of JP-2008-231416-A dated Oct. 2, 2008.
Machine translation of JP-2011-46836-A dated Mar. 10, 2011.
Machine translation of JP-2012-180397-A dated Sep. 20, 2012.
International Search Report issued in PCT/JP2014/078460 dated Jan. 27, 2015.
Heisler, "Advanced Vehicle Technology", Elsevier, 2nd edition, 2002, pp. 281-282 (4 pages total).
International Search Report (Form PCT/ISA/210) for International Application No. PCT/JP2011/066689 dated Aug. 16, 2011, with English translation.

(Continued)

*Primary Examiner* — Vickey Nerangis
(74) *Attorney, Agent, or Firm* — Birch, Stewart, Kolasch & Birch LLP

(57) ABSTRACT

The present invention provides a pneumatic tire provided with a tread formed from a rubber composition that can achieve balanced improvements in fuel economy and wet-grip performance. The present invention relates to a pneumatic tire provided with a tread formed from a rubber composition, the rubber composition containing a rubber component, silica, and a specific silane coupling agent, the rubber component containing, based on 100% by mass of the rubber component, not less than 5% by mass of a conjugated diene polymer containing a constituent unit based on a conjugated diene and a specific constituent unit, at least one terminal of the polymer being modified with a specific compound, the rubber composition containing the silica in an amount of 5 to 150 parts by mass relative to 100 parts by mass of the rubber component.

18 Claims, No Drawings

(56) References Cited

U.S. PATENT DOCUMENTS

| | | | |
|---|---|---|---|
| 2008/0027166 A1 | 1/2008 | Hochi et al. |
| 2009/0176910 A1 | 7/2009 | Anbe et al. |
| 2009/0247692 A1 | 10/2009 | Oshima et al. |
| 2010/0056703 A1 | 3/2010 | Oshima |
| 2010/0056709 A1 | 3/2010 | Oshima |
| 2010/0056710 A1 | 3/2010 | Oshima |
| 2010/0056712 A1 | 3/2010 | Oshima |
| 2010/0056713 A1 | 3/2010 | Oshima |
| 2010/0099795 A1 | 4/2010 | Uesaka |
| 2010/0108213 A1 | 5/2010 | Miyazaki |
| 2010/0113683 A1 | 5/2010 | Matsumoto et al. |
| 2010/0144954 A1 | 6/2010 | Kikuchi et al. |
| 2010/0184908 A1 | 7/2010 | Kikuchi et al. |
| 2012/0016056 A1 | 1/2012 | Miyazaki |
| 2012/0046413 A1 | 2/2012 | Sasaka |
| 2012/0149806 A1 | 6/2012 | Kondo et al. |
| 2013/0281590 A1 | 10/2013 | Lin et al. |
| 2013/0303679 A1 | 11/2013 | Kunisawa et al. |
| 2013/0310512 A1 | 11/2013 | Imoto et al. |
| 2014/0018490 A1 | 1/2014 | Taguchi et al. |

FOREIGN PATENT DOCUMENTS

| | | |
|---|---|---|
| CN | 1821293 A | 8/2006 |
| CN | 101360784 A | 2/2009 |
| CN | 101659728 A | 3/2010 |
| CN | 101659729 A | 3/2010 |
| CN | 101659731 A | 3/2010 |
| CN | 101659732 A | 3/2010 |
| CN | 101671418 A | 3/2010 |
| EP | 0042481 A1 | 12/1981 |
| EP | 0493364 A2 | 7/1992 |
| EP | 1075967 A1 | 2/2001 |
| EP | 2062620 A1 | 5/2009 |
| EP | 2098564 A1 | 9/2009 |
| EP | 2196324 A1 | 6/2010 |
| JP | 1-217047 A | 8/1989 |
| JP | 4-77536 A | 3/1992 |
| JP | 5-214170 A | 8/1993 |
| JP | 2000-344955 A | 12/2000 |
| JP | 2003-192842 A | 7/2003 |
| JP | 2003-533574 A | 11/2003 |
| JP | 2005-213486 A | 8/2005 |
| JP | 2005-263956 A | 9/2005 |
| JP | 2006-233177 A | 9/2006 |
| JP | 2007-177209 A | 7/2007 |
| JP | 2007-197671 A | 8/2007 |
| JP | 2008-50570 A | 3/2008 |
| JP | 2008-101127 A | 5/2008 |
| JP | 2008-150435 A | 7/2008 |
| JP | 2008-150436 A | 7/2008 |
| JP | 2008-231416 A | 10/2008 |
| JP | 2008-280438 A | 11/2008 |
| JP | 2009-91482 A | 4/2009 |
| JP | 2009-114262 A | 5/2009 |
| JP | 2009-126907 A | 6/2009 |
| JP | 2010-77412 A | 4/2010 |
| JP | 2010-77413 A | 4/2010 |
| JP | 2010-77414 A | 4/2010 |
| JP | 2010-77415 A | 4/2010 |
| JP | 2010-116556 A | 5/2010 |
| JP | 2010-215832 A | 9/2010 |
| JP | 2010-270292 A | 12/2010 |
| JP | 2011-046836 A | 3/2011 |
| JP | 2012-180397 A | 9/2012 |
| WO | WO 2007/081018 A1 | 7/2007 |
| WO | WO 2012/128320 A1 | 9/2012 |
| WO | WO 2012/133177 A1 | 10/2012 |
| WO | WO 2012/144487 A1 | 10/2012 |

OTHER PUBLICATIONS

International Search Report (Form PCT/ISA/210) for International Application No. PCT/JP2011/066700, dated Oct. 18, 2011, with English translation.
International Search Report (Form PCT/ISA/210) for International Application No. PCT/JP2012/057498 dated Jun. 19, 2012, with English translation.
International Search Report (Form PCT/ISA/210) for International Application No. PCT/JP2012/060342 dated Jul. 17, 2012, with English translation.
International Search Report (Form PCT/ISA/210) for International Application No. PCT/JP2012/060658 dated Jul. 24, 2012, with English translation.
International Search Report (Form PCT/ISA/210) for International Application No. PCT/JP2012/061345 dated Aug. 7, 2012, with English translation.
"Standard Test Method for Precipitated Silica-Surface Area by Multipoint BET Nitrogen Adsorption," Book of Standards, Active Standard ASTM D1993, vol. 09.01, retrieved from URL:http://www.astm.org/Standards/D1993.htm, Mar. 2013, 2 pages.

* cited by examiner

PNEUMATIC TIRE

TECHNICAL FIELD

The present invention relates to a pneumatic tire provided with a tread formed from a rubber composition.

BACKGROUND ART

With the recent increase in concern about environmental issues, the demand on automobiles for better fuel economy has been increasing. Better fuel economy is also required of rubber compositions for automotive tires. For example, rubber compositions containing a conjugated diene polymer such as polybutadiene or butadiene-styrene copolymer and filler such as carbon black or silica are used in automotive tires.

Patent Literature 1, for example, proposes a method for improving fuel economy by using a diene rubber which has been modified with an organosilicon compound containing an amino group and an alkoxy group. These days, however, further improvement of fuel economy has been demanded. Rubber compositions for automotive tires are also required to have properties including wet-grip performance. However, such properties are usually in a trade-off relationship with fuel economy. Thus, it has been difficult to provide a good balance of high levels of each property.

CITATION LIST

Patent Literature

Patent Literature 1: JP 2000-344955 A

SUMMARY OF INVENTION

Technical Problem

An object of the present invention is to solve the above problems and provide a pneumatic tire provided with a tread formed from a rubber composition that can achieve balanced improvements in fuel economy and wet-grip performance.

Solution to Problem

The present invention relates to a pneumatic tire, provided with a tread formed from a rubber composition, the rubber composition including: a rubber component, silica, and a silane coupling agent represented by Formula (1) below, the rubber component containing, based on 100% by mass of the rubber component, not less than 5% by mass of a conjugated diene polymer containing a constituent unit based on a conjugated diene and a constituent unit represented by Formula (I) below, at least one terminal of the polymer being modified with at least one compound selected from the group consisting of a compound represented by Formula (II) below, a compound containing a group represented by Formula (III) below, a compound represented by Formula (IV) below, a silicon compound containing at least one of a group represented by Formula (V) below or a group represented by Formula (VI) below, and a compound containing a group represented by Formula (VII) below, the rubber composition containing the silica in an amount of 5 to 150 parts by mass relative to 100 parts by mass of the rubber component,

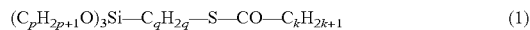
$$(C_pH_{2p+1}O)_3Si\text{—}C_qH_{2q}\text{—}S\text{—}CO\text{—}C_kH_{2k+1} \quad (1)$$

wherein p represents an integer of 1 to 3; q represents an integer of 1 to 5; and k represents an integer of 5 to 12,

wherein $X^1$, $X^2$, and $X^3$ each independently represent a group represented by Formula (Ia) below, a hydroxy group, a hydrocarbyl group, or a substituted hydrocarbyl group, and at least one of $X^1$, $X^2$, and $X^3$ is a hydroxy group or a group represented by the following Formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom,

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-containing functional group,

wherein p represents an integer of 0 or 1; T represents a $C_{1-20}$ hydrocarbylene group or a $C_{1-20}$ substituted hydrocarbylene group; and $A^2$ represents a nitrogen atom-containing functional group,

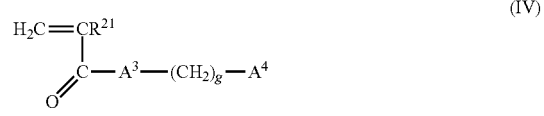

wherein g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group containing at least one of a nitrogen atom or an oxygen atom, (V)

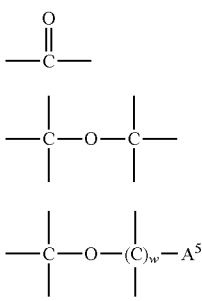

(VI)

(VII)

wherein w represents an integer of 1 to 11; and $A^5$ represents a nitrogen atom-containing functional group.

$R^1$ and $R^2$ in Formula (Ia) are preferably $C_{1-6}$ hydrocarbyl groups.

Two of $X^1$, $X^2$, and $X^3$ in Formula (I) are preferably each a group represented by Formula (Ia) or a hydroxy group.

$A^1$ in Formula (II) is preferably a group represented by the following Formula (IIa):

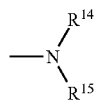

(IIa)

wherein $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

The group represented by Formula (III) is preferably a group represented by the following Formula (IIIa):

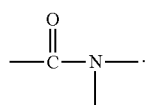

(IIIa)

The compound containing a group represented by Formula (III) is preferably at least one compound selected from the group consisting of a compound represented by Formula (IIIa-1) below, a compound represented by Formula (IIIa-2) below, and a compound represented by Formula (IIIa-3) below,

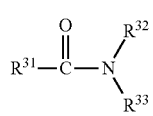

(IIIa-1)

wherein $R^{31}$ represents a hydrogen atom, a $C_{1-10}$ hydrocarbyl group, a $C_{1-10}$ substituted hydrocarbyl group, or a heterocyclic group containing at least one of a nitrogen atom or an oxygen atom as a heteroatom; and $R^{32}$ and $R^{33}$ each independently represent a $C_{1-10}$ group optionally containing at least one atom selected from the group consisting of a nitrogen atom, an oxygen atom, and a silicon atom, $R^{32}$ and $R^{33}$ may be bonded to each other to form a cyclic structure together with the nitrogen atom, and $R^{32}$ and $R^{33}$ may form a single group bonded to the nitrogen via a double bond,

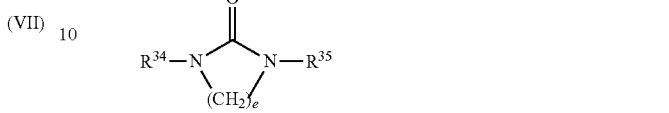

(IIIa-2)

wherein e represents an integer of 0 to 10; and $R^{34}$ and $R^{35}$ each independently represent a $C_{1-20}$ hydrocarbyl group or a $C_{1-20}$ substituted hydrocarbyl group,

(IIIa-3)

wherein f represents an integer of 0 to 10; and $R^{36}$ represents a $C_{1-20}$ hydrocarbyl group or a $C_{1-20}$ substituted hydrocarbyl group.

The compound containing a group represented by Formula (III) is preferably a compound represented by the following Formula (IIIb-1):

(IIIb-1)

wherein $R^{37}$ represents a hydrogen atom, a $C_{1-10}$ hydrocarbyl group, a $C_{1-10}$ substituted hydrocarbyl group, or a heterocyclic group containing at least one of a nitrogen atom or an oxygen atom as a heteroatom; $R^{38}$ and $R^{39}$ each independently represent a $C_{1-10}$ group optionally containing at least one atom selected from the group consisting of a nitrogen atom, an oxygen atom, and a silicon atom, $R^{38}$ and $R^{39}$ may be bonded to each other to form a cyclic structure together with the nitrogen atom, and $R^{38}$ and $R^{39}$ may form a single group bonded to the nitrogen via a double bond; and T represents a $C_{1-20}$ hydrocarbylene group or a $C_{1-20}$ substituted hydrocarbylene group.

The compound represented by Formula (IIIb-1) is preferably at least one compound selected from the group consisting of a compound represented by Formula (IIIb-1-1) below and a compound represented by Formula (IIIb-1-2) below,

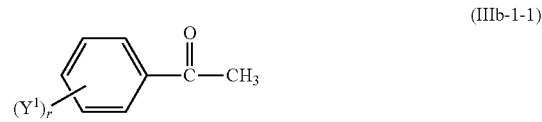

(IIIb-1-1)

wherein r represents an integer of 1 or 2; and $Y^1$ represents a nitrogen atom-containing functional group that is a substituent on the benzene ring, and when plural $Y^1$ groups are present, the plural $Y^1$ groups may be the same as or different from one another,

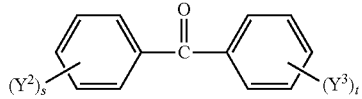

(IIIb-1-2)

wherein s represents an integer of 1 or 2; t represents an integer of 0 to 2; and $Y^2$ and $Y^3$ each represent a nitrogen atom-containing functional group that is a substituent on the benzene ring, and when plural $Y^2$ groups are present, the plural $Y^2$ groups may be the same as or different from one another, and when plural $Y^3$ groups are present, the plural $Y^3$ groups may be the same as or different from one another.

$A^4$ in Formula (IV) is preferably a hydroxy group or a group represented by the following Formula (IVa):

(IVa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

The silicon compound preferably contains a group represented by the following Formula (VIII):

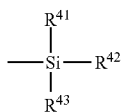

(VIII)

wherein $R^{41}$, $R^{42}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ is a hydrocarbyloxy group.

The silicon compound preferably contains a group represented by the following Formula (Va):

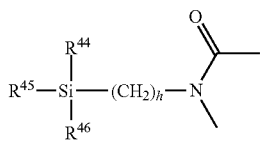

(Va)

wherein h represents an integer of 1 to 10; and $R^{44}$, $R^{45}$, and $R^{46}$ each independently represent a $C_{1-4}$ hydrocarbyl group or a $C_{1-4}$ hydrocarbyloxy group, and at least one of $R^{44}$, $R^{45}$, and $R^{46}$ is a hydrocarbyloxy group.

The compound containing a group represented by Formula (VII) is preferably a compound represented by the following Formula (VII-1):

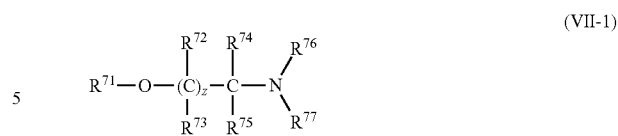

(VII-1)

wherein z represents an integer of 0 to 10; $R^{71}$ represents a $C_{1-5}$ hydrocarbyl group; $R^{72}$, $R^{73}$, $R^{74}$ and $R^{75}$ each independently represent a hydrogen atom, a $C_{1-5}$ hydrocarbyl group, a $C_{1-5}$ substituted hydrocarbyl group, or a $C_{1-5}$ hydrocarbyloxy group, and when plural $R^{72}$ groups and plural $R^{73}$ groups are present, the plural $R^{72}$ groups and the plural $R^{73}$ groups may be the same as or different from one another; and $R^{76}$ and $R^{77}$ each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

One of $R^{74}$ and $R^{75}$ in Formula (VII-1) is preferably a hydrogen atom.

The conjugated diene polymer preferably has a vinyl bond content of at least 10 mol % but not more than 80 mol % per 100 mol % of the constituent unit based on a conjugated diene.

Preferably, the rubber component contains at least one of natural rubber or polybutadiene rubber.

The silica preferably has a nitrogen adsorption specific surface area of 40 to 400 m²/g.

The rubber composition preferably contains the silane coupling agent represented by Formula (1) in an amount of 0.05 to 30 parts by mass relative to 100 parts by mass of silica.

Advantageous Effects of Invention

The rubber composition in the present invention contains a specific conjugated diene polymer, silica, and a specific silane coupling agent. The use of such a rubber composition can provide a pneumatic tire that achieves balanced improvements in fuel economy and wet-grip performance.

DESCRIPTION OF EMBODIMENTS

The rubber composition in the present invention contains: a conjugated diene polymer containing a constituent unit based on a conjugated diene and a constituent unit represented by Formula (I) below; silica; and a specific silane coupling agent, wherein at least one terminal of the polymer is modified with at least one compound selected from the group consisting of a compound represented by Formula (II) below, a compound containing a group represented by Formula (III) below, a compound represented by Formula (IV) below, a silicon compound containing a group represented by Formula (V) below and/or a group represented by Formula (VI) below, and a compound containing a group represented by Formula (VII) below,

(I)

wherein X¹, X², and X³ each independently represent a group represented by Formula (Ia) below, a hydroxy group, a hydrocarbyl group, or a substituted hydrocarbyl group, and at least one of X¹, X², and X³ is a hydroxy group or a group represented by the following Formula (Ia):

(Ia)

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom,

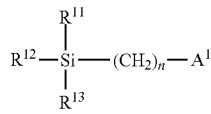
(II)

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-containing functional group,

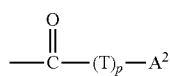
(III)

wherein p represents an integer of 0 or 1; T represents a $C_{1-20}$ hydrocarbylene group or a $C_{1-20}$ substituted hydrocarbylene group; and $A^2$ represents a nitrogen atom-containing functional group,

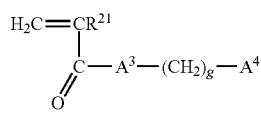
(IV)

wherein g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group containing a nitrogen atom and/or an oxygen atom,

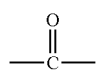
(V)

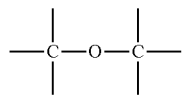
(VI)

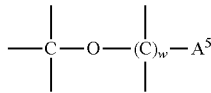
(VII)

wherein w represents an integer of 1 to 11; and $A^5$ represents a nitrogen atom-containing functional group.

The conjugated dienes for the conjugated diene-based constituent unit can be exemplified by 1,3-butadiene, isoprene, 1,3-pentadiene, 2,3-dimethyl-1,3-butadiene, and 1,3-hexadiene, and one or two or more of these may be used. In view of ease of availability, preferred is 1,3-butadiene or isoprene.

X¹, X², and X³ in Formula (I) of the constituent unit represented by Formula (I) each independently represent a group represented by Formula (Ia), a hydroxy group, a hydrocarbyl group, or a substituted hydrocarbyl group, and at least one of X¹, X², and X³ is a group represented by Formula (Ia) or a hydroxy group.

$R^1$ and $R^2$ in Formula (Ia) each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom.

As used herein, the term "hydrocarbyl group" denotes a monovalent hydrocarbon residue. This hydrocarbon residue refers to a group obtained by removing hydrogen from a hydrocarbon. The term "substituted hydrocarbyl group" denotes a group obtained by replacing one or more hydrogen atoms of a monovalent hydrocarbon residue by substituents. The term "hydrocarbyloxy group" denotes a group obtained by replacing the hydrogen atom of a hydroxy group by a hydrocarbyl group. The term "substituted hydrocarbyloxy group" denotes a group obtained by replacing one or more hydrogen atoms of a hydrocarbyloxy group by substituents. The term "hydrocarbylene group" denotes a divalent hydrocarbon residue. The term "substituted hydrocarbylene group" denotes a group obtained by replacing one or more hydrogen atoms of a divalent hydrocarbon residue by substituents. The term "substituted silyl group" denotes a group obtained by replacing one or more hydrogen atoms of a silyl group by substituents.

The $C_{1-6}$ hydrocarbyl groups encompassed by $R^1$ and $R^2$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^1$ and $R^2$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups. The groups containing a silicon atom-containing group as a substituent can be exemplified by trialkylsilylalkyl groups such as a trimethylsilylmethyl group.

The substituted silyl groups encompassed by $R^1$ and $R^2$ can be exemplified by trialkylsilyl groups such as trimethylsilyl, triethylsilyl, and t-butyldimethylsilyl groups.

The groups in which $R^1$ and $R^2$ are bonded to each other can be exemplified by $C_{1-12}$ divalent groups optionally containing at least one atom, selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N═CH—.

The group in which $R^1$ and $R^2$ are bonded to each other is preferably a nitrogenous group, more preferably a group represented by —$CH_2CH_2$—NH—$CH_2$— or a group represented by —$CH_2CH_2$—N═CH—.

The hydrocarbyl group as $R^1$ and $R^2$ is preferably an alkyl group, more preferably a $C_{1-4}$ alkyl group, further preferably a methyl group, an ethyl group, an n-propyl group, or an n-butyl group, particularly preferably an ethyl group or an n-butyl group. The substituted hydrocarbyl group as $R^1$ and $R^2$ is preferably an alkoxyalkyl group, more preferably a $C_{1-4}$ alkoxyalkyl group. The substituted silyl group as $R^1$ and $R^2$ is preferably a trialkylsilyl group, more preferably a trimethylsilyl group.

Preferably, $R^1$ and $R^2$ are bonded to each other to form a nitrogenous group or are each an alkyl group, an alkoxyalkyl group, or a substituted silyl group, more preferably an alkyl group, still more preferably a $C_{1-4}$ alkyl group, further preferably a methyl group, an ethyl group, an n-propyl group, or an n-butyl group.

The group represented by Formula (Ia) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of economic efficiency and ease of availability, the group represented by Formula (Ia) is preferably an acyclic amino group, more preferably a dialkylamino group, still more preferably a dialkylamino group having a $C_{1-4}$ alkyl substituent, further preferably a dimethylamino group, a diethylamino group, a di(n-propyl)amino group, or a di(n-butyl)amino group.

The hydrocarbyl groups encompassed by $X^1$, $X^2$, and $X^3$ in Formula (I) can be exemplified by alkyl groups such as methyl, ethyl, n-propyl, isopropyl, n-butyl, sec-butyl, and tert-butyl groups. The substituted hydrocarbyl groups can be exemplified by alkoxyalkyl groups such as methoxymethyl, ethoxymethyl, methoxyethyl, and ethoxyethyl groups.

The hydrocarbyl group as $X^1$, $X^2$, and $X^3$ is preferably an alkyl group, more preferably a $C_{1-4}$ alkyl group, still more preferably a methyl group or an ethyl group. The substituted hydrocarbyl group as $X^1$, $X^2$, and $X^3$ is preferably an alkoxyalkyl group, more preferably a $C_{1-4}$ alkoxyalkyl group.

The hydrocarbyl group or substituted hydrocarbyl group as $X^1$, $X^2$, and $X^3$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, further preferably a methyl group or an ethyl group.

At least one of $X^1$, $X^2$, and $X^3$ in Formula (I) is a hydroxy group or a group represented by Formula (Ia). Preferably at least two of $X^1$, $X^2$, and $X^3$ are each a hydroxy group or a group represented by Formula (Ia). More preferably two of $X^1$, $X^2$, and $X^3$ are each a hydroxy group or a group represented by Formula (Ia). In view of providing a good balance of high levels of fuel economy and wet-grip performance, preferably at least one of $X^1$, $X^2$, and $X^3$ is a hydroxy group, more preferably at least two of $X^1$, $X^2$, and $X^3$ are hydroxy groups, and still more preferably two of $X^1$, $X^2$, and $X^3$ are hydroxy groups.

In view of achieving balanced improvements in fuel economy and wet-grip performance, the constituent unit represented by Formula (I) is preferably a constituent unit in which two of $X^1$, $X^2$, and $X^3$ are each an acyclic amino group or a hydroxy group. The constituent unit in which two of $X^1$, $X^2$, and $X^3$ are acyclic amino groups is preferably a bis(dialkylamino)alkylvinylsilane unit, more preferably a bis(dimethylamino)methylvinylsilane unit, a bis(diethylamino)methylvinylsilane unit, a bis(di(n-propyl)amino)methylvinylsilane unit, or a bis(di(n-butyl)amino)methylvinylsilane unit. The constituent unit in which two of $X^1$, $X^2$, and $X^3$ are hydroxy groups is preferably a dihydroxyalkylvinylsilane unit, more preferably a dihydroxymethvlvinylsilane unit.

In view of achieving balanced improvements in fuel economy and wet-grip performance, the content of the constituent unit represented by Formula (I) in the conjugated diene polymer, expressed per unit mass of the polymer, is preferably at least 0.001 mmol/g-polymer but not more than 0.1 mmol/g-polymer, more preferably at least 0.002 mmol/g-polymer but not more than 0.07 mmol/g-polymer, still more preferably at least 0.003 mmol/g-polymer but not more than 0.05 mmol/g-polymer.

At least one terminal of the conjugated diene polymer is modified with a specific compound (modifying agent 1 to 5). This causes interaction with silica, thereby resulting in balanced improvements in fuel economy and wet-grip performance.

The following explains a compound represented by the following Formula (II) (modifying agent 1):

(II)

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-containing functional group.

$R^{11}$, $R^{12}$, and $R^{13}$ in Formula (II) each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group.

The hydrocarbyl groups encompassed by $R^{11}$, $R^{12}$, and $R^{13}$ can be exemplified by alkyl groups such as methyl, ethyl, n-propyl, isopropyl, n-butyl, sec-butyl, and tert-butyl groups. The hydrocarbyloxy groups encompassed by $R^{11}$, $R^{12}$, and $R^{13}$ can be exemplified by alkoxy groups such as methoxy, ethoxy, n-propoxy, isopropoxy, n-butoxy, sec-butoxy, and t-butoxy groups.

The hydrocarbyl group as $R^{11}$, $R^{12}$, and $R^{13}$ is preferably an alkyl group, more preferably a $C_{1-3}$ alkyl group, still more preferably a methyl group or an ethyl group. The hydrocarbyloxy group as $R^{11}$, $R^{12}$, and $R^{13}$ is preferably an alkoxy group, more preferably a $C_{1-3}$ alkoxy group, still more preferably a methoxy group or an ethoxy group.

In view of achieving balanced improvements in fuel economy and wet-grip performance, preferably at least two of $R^{11}$, $R^{12}$, and $R^{13}$ are hydrocarbyloxy groups, and more preferably the three $R^{11}$, $R^{12}$, and $R^{13}$ groups are hydrocarbyloxy groups.

In Formula (II), n represents an integer of 1 to 10. In view of achieving balanced improvements in fuel economy and wet-grip performance, n is preferably an integer of 3 or more. In view of improving economic efficiency, n is preferably an integer of 4 or less. Particularly preferably, n is 3.

$A^1$ in Formula (II) represents a nitrogen atom-containing functional group, and examples include amino, isocyano, cyano, pyridyl, piperidyl, pyrazinyl, and morpholino groups.

$A^1$ is preferably a group represented by the following Formula (IIa):

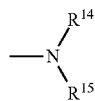

wherein $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

$R^{14}$ and $R^{15}$ in Formula (IIa) may each be a $C_{1-6}$ hydrocarbyl group, a $C_{1-6}$ substituted hydrocarbyl group, or a substituted silyl group.

The hydrocarbyl groups encompassed by $R^{14}$ and $R^{15}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{14}$ and $R^{15}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-containing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by replacing at least one hydrogen atom of an alkyl group by an alkylene oxide group.

The substituted silyl groups encompassed by $R^{14}$ and $R^{15}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{14}$ and $A^{15}$ are bonded to each other can be exemplified by $C_{2-12}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by $-CH_2CH_2-NH-CH_2-$ and a group represented by $-CH_2CH_2-N=CH-$.

The group in which $R^{14}$ and $R^{15}$ are bonded to each other is preferably a nitrogenous group, more preferably a group represented by $-CH_2CH_2-NH-CH_2-$ or a group represented by $-CH_2CH_2-N=CH-$.

The single groups bonded to the nitrogen via a double bond, encompassed by $R^{14}$ and $R^{15}$ can be exemplified by $C_{2-12}$ divalent groups optionally containing at least one atom selected from the group consisting of a nitrogen atom, an oxygen atom, and a silicon atom. Examples include an ethylidene group, a 1-methylpropylidene group, a 1,3-dimethylbutylidene group, a 1-methylethylidene group, and a 4-N,N-dimethylaminobenzylidene group.

The hydrocarbyl group as $R^{14}$ and $R^{15}$ is preferably an alkyl group, more preferably a $C_{1-4}$ alkyl group, still more preferably a methyl group, an ethyl group, an n-propyl group, or an n-butyl group, further preferably a methyl group or an ethyl group. The substituted hydrocarbyl group as $R^{14}$ and $R^{15}$ is preferably an alkoxyalkyl group, an alkylene oxide group, or an alkylene oxide alkyl group. The substituted silyl group as $R^{14}$ and $R^{15}$ is preferably a trialkylsilyl group or a trialkoxysilyl group, more preferably a trialkylsilyl group, still more preferably a trimethylsilyl group or a triethylsilyl group.

Preferably, $R^{14}$ and $R^{15}$ are bonded to each other to form a nitrogenous group or are each an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The group represented by Formula (IIa) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups. They can also be exemplified by di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Other examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are replaced by two alkylene oxide groups. The term "di(alkylene oxide alkyl)amino group" denotes an amino group in which two hydrogen atoms bonded to the nitrogen atom are replaced by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, and long-term stability and easy availability of the compound, the group represented by Formula (IIa) is preferably an acyclic amino group, more preferably a dialkylamino group, a di(alkylene oxide)amino group, a di(alkylene oxide alkyl)amino group, or a di(trialkylsilyl)amino group.

The compounds represented by Formula (II) can be exemplified by compounds in which the group represented by Formula (IIa) is an acyclic amino group such as a dialkylamino group, a di(alkoxyalkyl)amino group, a di(alkylene oxide)amino group, a di(alkylene oxide alkyl) amino group, or a trialkylsilyl group.

The compounds in which the group represented by Formula (IIa) is a dialkylamino group can be exemplified by the following:
[3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamine)propyl]triethoxysilane, and
[3-(ethylmethylamino)propyl]triethoxysilane;
[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and
[3-(dialkylamine)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

The compounds in which the group represented by Formula (IIa) is a di(alkoxyalkyl)amino group can be exemplified by the following:
{3-[di(alkoxyalkyl)amino]propyl}trialkoxysilanes such as
  {3-[di(methoxymethyl)amino]propyl}trimethoxysilane,
  {3-[di(ethoxymethyl)amino]propyl}trimethoxysilane,
  {3-[di(methoxyethyl)amino]propyl}trimethoxysilane,
  {3-[di(ethoxyethyl)amino]propyl}trimethoxysilane,
  {3-[di(methoxymethyl)amino]propyl}triethoxysilane,
  {3-[di(ethoxymethyl)amino]propyl}triethoxysilane,
  {3-[di(methoxyethyl)amino]propyl}triethoxysilane, and
  {3-[di(ethoxyethyl)amino]propyl}triethoxysilane;
{3-[di(alkoxyalkyl)amino]propyl}alkyldialkoxysilanes such as
  {3-[di(methoxymethyl)amino]propyl}methyldimethoxysilane,
  {3-[di(ethoxymethyl)amino]propyl}methyldimethoxysilane,
  {3-[di(methoxyethyl)amino]propyl}methyldimethoxysilane,
  {3-[di(ethoxyethyl)amino]propyl}methyldimethoxysilane,
  {3-[di(methoxymethyl)amino]propyl}ethyldimethoxysilane,
  {3-[di(ethoxymethyl)amino]propyl}ethyldimethoxysilane,
  {3-[di(methoxyethyl)amino]propyl}ethyldimethoxysilane,
  {3-[di(ethoxyethyl)amino]propyl}ethyldimethoxysilane,
  {3-[di(methoxymethyl)amino]propyl}methyldiethoxysilane,
  {3-[di(ethoxymethyl)amino]propyl}methyldiethoxysilane,
  {3-[di(methoxyethyl)amino]propyl}methyldiethoxysilane,
  {3-[di(ethoxyethyl)amino]propyl}methyldiethoxysilane,
  {3-[di(methoxymethyl)amino]propyl}ethyldiethoxysilane,
  {3-[di(ethoxymethyl)amino]propyl}ethyldiethoxysilane,
  {3-[di(methoxyethyl)amino]propyl}ethyldiethoxysilane, and
  {3-[di(ethoxyethyl)amino]propyl}ethyldiethoxysilane; and
{3-[di(alkoxyalkyl)amino]propyl}dialkylalkoxysilanes such as
  {3-[di(methoxymethyl)amino]propyl}dimethylmethoxysilane,
  {3-[di(ethoxymethyl)amino]propyl}dimethylmethoxysilane,
  {3-[di(methoxyethyl)amino]propyl}dimethylmethoxysilane,
  {3-[di(ethoxyethyl)amino]propyl}dimethylmethoxysilane,
  {3-[di(methoxymethyl)amino]propyl}diethylmethoxysilane,
  {3-[di(ethoxymethyl)amino]propyl}diethylmethoxysilane,
  {3-[di(methoxyethyl)amino]propyl}diethylmethoxysilane,
  {3-[di(ethoxyethyl)amino]propyl}diethylmethoxysilane,
  {3-[di(methoxymethyl)amino]propyl}dimethylethoxysilane,
  {3-[di(ethoxymethyl)amino]propyl}dimethylethoxysilane,
  {3-[di(methoxyethyl)amino]propyl}dimethylethoxysilane,
  {3-[di(ethoxyethyl)amino]propyl}dimethylethoxysilane,
  {3-[di(methoxymethyl)amino]propyl}diethylethoxysilane,
  {3-[di(ethoxyethyl)amino]propyl}diethylethoxysilane,
  {3-[di(methoxyethyl)amino]propyl}diethylethoxysilane, and
  {3-[di(ethoxyethyl)amino]propyl}diethylethoxysilane.

The compounds in which the group represented by Formula (IIa) is a di(alkylene oxide)amino group can be exemplified by compounds in which the group represented by Formula (IIa) is a di(epoxy)amino group, such as
{3-[di(epoxy)amino]propyl}trimethoxysilane,
{3-[di(epoxy)amino]propyl}triethoxysilane,
{3-[di(epoxy)amino]propyl}methyldimethoxysilane,
{3-[di(epoxy)amino]propyl}ethyldimethoxysilane,
{3-[di(epoxy)amino]propyl}methyldiethoxysilane,
{3-[di(epoxy)amino]propyl}ethyldiethoxysilane,
{3-[di(epoxy)amino]propyl}dimethylmethoxysilane,
{3-[di(epoxy)amino]propyl}diethylmethoxysilane,
{3-[di(epoxy)amino]propyl}dimethylethoxysilane, and
{3-[di(epoxy)amino]propyl}diethylethoxysilane; and
compounds in which the group represented by Formula (IIa) is a di(tetrahydrofuranyl)amino group, such as
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}-methyldimethoxysilane,
{3-[di(tetrahydrofuranyl)amino]propyl}-ethyldimethoxysilane,
{3-[di(tetrahydrofuranyl)amino]propyl}-methyldiethoxysilane,
{3-[di(tetrahydrofuranyl)amino]propyl}-ethyldiethoxysilane,
{3-[di(tetrahydrofuranyl)amino]propyl}-dimethylmethoxysilane,
{3-[di(tetrahydrofuranyl)amino]propyl}-diethylmethoxysilane,
{3-[di(tetrahydrofuranyl)amino]propyl}-dimethylethoxysilane, and
{3-[di(tetrahydrofuranyl)amino]propyl}-diethylethoxysilane.

The compounds in which the group represented by Formula (IIa) is a di(alkylene oxide alkyl)amino group can be exemplified by compounds in which the group represented by Formula (IIa) is a di(glycidyl)amino group, such as
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane; and
compounds in which the group represented by Formula (IIa) is a di(tetrahydrofurfuryl)amino group, such as
{3-[di(tetrahydrofurfuryl)amino]propyl}trimethoxysilane,
{3-[di(tetrahydrofurfuryl)amino]propyl}triethoxysilane,
{3-[di(tetrahydrofurfuryl)amino]propyl}-methyldimethoxysilane,
{3-[di(tetrahydrofurfuryl)amino]propyl}-ethyldimethoxysilane,
{3-[di(tetrahydrofurfuryl)amino]propyl}-methyldiethoxysilane,
{3-[di(tetrahydrofurfuryl)amino]propyl}-ethyldiethoxysilane,
{3-[di(tetrahydrofurfuryl)amino]propyl}-dimethylmethoxysilane,
{3-[di(tetrahydrofurfuryl)amino]propyl}-diethylmethoxysilane,
{3-[di(tetrahydrofurfuryl)amino]propyl}-dimethylethoxysilane, and
{3-[di(tetrahydrofurfuryl)amino]propyl}-diethylethoxysilane.

The compounds in which the group represented by Formula (IIa) is a trialkylsilyl group can be exemplified by the following:
{3-[di(trialkylsilyl)amino]propyl}trialkoxysilanes such as
{3-[di(trimethylsilyl)amino]propyl}trimethoxysilane,
{3-[di(t-butyldimethylsilyl)amino]propyl}-trimethoxysilane,
{3-[di(trimethylsilyl)amino]propyl}triethoxysilane, and
{3-[di(t-butyldimethylsilyl)amino]propyl}-triethoxysilane;
{3-[di(trialkylsilyl)amino]propyl}alkyldialkoxysilanes such as
{3-[di(trimethylsilyl)amino]propyl}methyldimethoxysilane,
{3-[di(t-butyldimethylsilyl)amino]propyl}-methyldimethoxysilane,
{3-[di(trimethylsilyl)amino]propyl}methyldiethoxysilane, and
{3-[di(t-butyldimethylsilyl)amino]propyl}-methyldiethoxysilane; and
{3-[di(trialkylsilyl)amino]propyl}dialkylalkoxysilanes such as
{3-[di(trimethylsilyl)amino]propyl}dimethylmethoxysilane,
{3-[di(t-butyldimethylsilyl)amino]propyl}-dimethylmethoxysilane,
{3-[di(trimethylsilyl)amino]propyl}dimethylethoxysilane, and
{3-[di(t-butyldimethylsilyl)amino]propyl}-dimethylethoxysilane.

Preferred among the foregoing are [3-(dialkylamino)propyl]trialkoxysilanes, and more preferred are [3-(dimethylamino)propyl]trimethoxysilane,
[3-(diethylamino)propyl]trimethoxysilane,
[3-(dimethylamino)propyl]triethoxysilane, and
[3-(diethylamino)propyl]triethoxysilane.

The compounds represented by Formula (II) can also be exemplified by compounds in which the group represented by Formula (IIa) is a cyclic amino group such as a 1-piperidino group, a 1-hexamethyleneimino group, a 1-imidazolyl group, a 4,5-dihydro-1-imidazolyl group, a 1-piperazinyl group, or a morpholino group.

The compounds in which the group represented by Formula (IIa) is a 1-piperidino group can be exemplified by
3-(1-piperidino)propyltrimethoxysilane,
3-(1-piperidino)propyltriethoxysilane,
3-(1-piperidino)propylmethyldimethoxysilane,
3-(1-piperidino)propylethyldimethoxysilane,
3-(1-piperidino)propylmethyldiethoxysilane, and
3-(1-piperidino)propylethyldiethoxysilane.

The compounds in which the group represented by Formula (IIa) is a 1-hexamethyleneimino group can be exemplified by
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane, and
3-(1-hexamethyleneimino)propylethyldiethoxysilane.

The compounds in which the group represented by Formula (IIa) is a 1-imidazolyl group can be exemplified by
N-(3-trimethoxysilylpropyl)imidazole and
N-(3-triethoxysilylpropyl)imidazole.

The compounds in which the group represented by Formula (IIa) is a 4,5-dihydro-1-imidazolyl group can be exemplified by
N-(3-trimethoxysilylpropyl)-4,5-dihydroimidazole and
N-(3-triethoxysilylpropyl)-4,5-dihydroimidazole.

The compounds in which the group represented by Formula (IIa) is a 1-piperazinyl group can be exemplified by
3-(1-piperazinyl)propyltrimethoxysilane,
3-(1-piperazinyl)propyltriethoxysilane,
3-(1-piperazinyl)propylmethyldimethoxysilane,
3-(1-piperazinyl)propylethyldimethoxysilane,
3-(1-piperazinyl)propylmethyldiethoxysilane, and
3-(1-piperazinyl)propylethyldiethoxysilane.

The compounds in which the group represented by Formula (IIa) is a morpholino group can be exemplified by
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Among the foregoing, compounds in which the group represented by Formula (IIa) is a 1-imidazolyl group and compounds in which the group represented by Formula (IIa) is a 4,5-dihydro-1-imidazolyl group are preferred, and
N-(3-trimethoxysilylpropyl)imidazole,
N-(3-triethoxysilylpropyl)imidazole,
N-(3-trimethoxysilylpropyl)-4,5-dihydroimidazole, and
N-(3-triethoxysilylpropyl)-4,5-dihydroimidazole are more preferred.

The following explains a compound containing a group represented by the following Formula (III) (modifying agent 2):

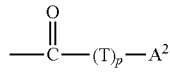

(III)

wherein p represents an integer of 0 or 1; T represents a $C_{1-20}$ hydrocarbylene group or a $C_{1-20}$ substituted hydrocarbylene group; and $A^2$ represents a nitrogen atom-containing functional group.

p represents an integer of 0 or 1. T represents a $C_{1-20}$ hydrocarbylene group or a $C_{1-20}$ substituted hydrocarbylene group. $A^2$ represents a nitrogen atom-containing functional group, and examples include amino, isocyano, cyano, pyridyl, piperidyl, pyrazinyl, and morpholino groups.

The compounds containing a group represented by Formula (III) can be exemplified by compounds containing a group represented by Formula (III) in which p is 0 and $A^2$ is an amino group, namely, a group represented by Formula (IIIa) below.

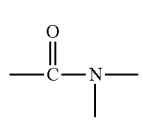

(IIIa)

Examples of the compound containing a group represented by Formula (IIIa) include carboxylic acid amide compounds such as formamide, acetamide, and propionamide. Other examples include cyclic compounds such as imidazolidinone or derivatives thereof and lactams.

The compounds containing a group represented by Formula (IIIa) can be exemplified by carboxylic acid amide compounds represented by the following Formula (IIIa-1):

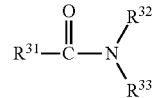

(IIIa-1)

wherein $R^{31}$ represents a hydrogen atom, a $C_{1-10}$ hydrocarbyl group, a $C_{1-10}$ substituted hydrocarbyl group, or a heterocyclic group containing a nitrogen atom and/or an oxygen atom as a heteroatom; and $R^{32}$ and $R^{33}$ each independently represent a $C_{1-10}$ group optionally containing at least one atom selected from the group consisting of a nitrogen atom, an oxygen atom, and a silicon atom, $R^{32}$ and $R^{33}$ may be bonded to each other to form a cyclic structure together with the nitrogen atom, and $R^{32}$ and $R^{33}$ may form a single group bonded to the nitrogen via a double bond.

The hydrocarbyl groups encompassed by $R^{31}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{31}$ can be exemplified by substituted hydrocarbyl groups containing as a substituent at least one group selected from the group consisting of nitrogen atom-containing groups and oxygen atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups.

The heterocyclic group containing a nitrogen atom and/or an oxygen atom as a heteroatom for $R^{31}$ refers to a residue of a heterocyclic compound that contains a nitrogen atom and/or an oxygen atom in the ring. Such groups can be exemplified by a 2-pyridyl group, a 3-pyridyl group, a 4-pyridyl group, and a 2-furyl group.

$R^{31}$ is preferably a $C_{1-10}$ hydrocarbyl group or a $C_{1-10}$ substituted hydrocarbyl group, more preferably a $C_{1-4}$ alkyl group, particularly preferably a methyl group, an ethyl group, an n-propyl group, or an n-butyl group.

$R^{32}$ and $R^{33}$ in Formula (IIIa-1) may each be a $C_{1-10}$ hydrocarbyl group or a $C_{1-10}$ substituted hydrocarbyl group. The hydrocarbyl groups encompassed by $R^{32}$ and $R^{33}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{32}$ and $R^{33}$ can be exemplified by substituted hydrocarbyl groups containing as a substituent at least one group selected from the group consisting of nitrogen atom-containing groups and oxygen atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups.

The groups in which $R^{32}$ and $R^{33}$ are bonded to each other can be exemplified by $C_{2-20}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N=CH—.

The single groups bonded to the nitrogen via a double bond, encompassed by $R^{32}$ and $R^{33}$ can be exemplified by $C_{2-12}$ divalent groups optionally containing at least one atom selected from the group consisting of a nitrogen atom and an oxygen atom. Examples include an ethylidene group, a 1-methylpropylidene group, a 1,3-dimethylbutylidene group, a 1-methylethylidene group, and a 4-N,N-dimethylaminobenzylidene group.

$R^{32}$ and $R^{33}$ are each preferably a hydrocarbyl group, more preferably an alkyl group, still more preferably a $C_{1-4}$ alkyl group, particularly preferably a methyl group, an ethyl group, an n-propyl group, or an n-butyl group.

The carboxylic acid amide compounds represented by Formula (IIIa-1) can be exemplified by formamide compounds such as formamide, N,N-dimethylformamide, and N,N-diethylformamide;

acetamide compounds such as acetamide, N,N-dimethylacetamide, N,N-diethylacetamide, aminoacetamide, N,N-dimethyl-N',N'-dimethylaminoacetamide, N,N-dimethylaminoacetamide, N-ethylaminoacetamide, N,N-dimethyl-N'-ethylaminoacetamide, N,N-dimethylaminoacetamide, and N-phenyldiacetamide;

propionamide compounds such as propionamide and N,N-dimethylpropionamide;

pyridylamide compounds such as 4-pyridylamide and N,N-dimethyl-4-pyridylamide;

benzamide compounds such as benzamide, N,N-dimethylbenzamide, N',N'-(p-dimethylamino)benzamide, N',N'-(p-diethylamino)benzamide, N,N-dimethyl-N',N'-(p-dimethylamino)benzamide, and N,N-dimethyl-N',N'-(p-diethylamino)benzamide;

acrylamide compounds such as N,N-dimethylacrylamide and N,N-diethylacrylamide;

methacrylamide compounds such as N,N-dimethylmethacrylamide and N,N-diethylmethacrylamide;

nicotinamide compounds such as N,N-dimethylnicotinamide and N,N-diethylnicotinamide;

phthalamide compounds such as N,N,N',N'-tetramethylphthalamide and N,N,N',N'-tetraethylphthalamide; and phthalimide compounds such as N-methylphthalimide and N-ethylphthalimide.

The cyclic compounds containing a group represented by Formula (IIIa) can be exemplified by compounds represented by the following Formula (IIIa-2) and compounds represented by the following Formula (IIIa-3):

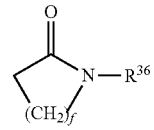

(IIIa-2)

wherein e represents an integer of 0 to 10; and $R^{34}$ and $R^{35}$ each independently represent a $C_{1-20}$ hydrocarbyl group or a $C_{1-20}$ substituted hydrocarbyl group,

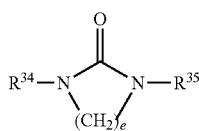

(IIIa-3)

wherein f represents an integer of 0 to 10; and $R^{36}$ represents a $C_{1-20}$ hydrocarbyl group or a $C_{1-20}$ substituted hydrocarbyl group.

$R^{34}$, $R^{35}$, and $R^{36}$ in Formulas (IIIa-2) and (IIIa-3) each independently represent a $C_{1-20}$ hydrocarbyl group or a $C_{1-20}$ substituted hydrocarbyl group. The hydrocarbyl groups encompassed by $R^{34}$, $R^{35}$, and $R^{36}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{34}$, $R^{35}$, and $R^{36}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups; and alkoxyaryl groups such as methoxyphenyl and ethoxyphenyl groups. The groups containing a silicon atom-containing group as a substituent can be exemplified by trimethylsilylmethyl, t-butyldimethylsilyloxymethyl, and trimethoxysilylpropyl groups.

$R^{34}$ and $R^{35}$ in Formula (IIIa-2) are each preferably a hydrocarbyl group, more preferably an alkyl group, still more preferably a methyl group.

$R^{36}$ in Formula (IIIa-3) is preferably a hydrocarbyl group, more preferably an alkyl group or an aryl group, still more preferably a methyl group or a phenyl group.

In Formulas (IIIa-2) and (IIIa-3), e and f each represent an integer of 0 to 10. In view of achieving balanced improvements in fuel economy and wet-grip performance, e and f are each preferably an integer of 2 or more, while in view of improving economic efficiency in the production, e and f are each preferably an integer of 7 or less.

The compounds represented by Formula (IIIa-2) can be exemplified by 1,3-hydrocarbyl-substituted 2-imidazolidinones such as 1,3-dimethyl-2-imidazolidinone, 1,3-diethyl-2-imidazolidinone, 1,3-di(n-propyl)-2-imidazolidinone, 1,3-di(t-butyl)-2-imidazolidinone, and 1,3-diphenyl-2-imidazolidinone. Preferred are 1,3-substituted 2-imidazolidinones, more preferably 1,3-hydrocarbyl-substituted 2-imidazolidinones, still more preferably 1,3-dialkyl-2-imidazolidinones. The 1,3-dialkyl-2-imidazolidinone is preferably 1,3-dimethyl-2-imidazolidinone, 1,3-diethyl-2-imidazolidinone, or 1,3-di(n-propyl)-2-imidazolidinone, more preferably 1,3-dimethyl-2-imidazolidinone.

The compounds represented by Formula (IIIa-3) can be exemplified by β-propiolactam compounds such as N-methyl-β-propiolactam, N-(t-butyl)-β-propiolactam, and N-phenyl-β-propiolactam;

2-pyrrolidone compounds such as 1-methyl-2-pyrrolidone, 1-(t-butyl)-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(t-butyl)-5-methyl-2-pyrrolidone, and 1-(t-butyl)-1,3-dimethyl-2-pyrrolidone;

2-piperidone compounds such as 1-(t-butyl)-2-piperidone, 1-phenyl-2-piperidone, 1-(p-methylphenyl)-2-piperidone, 1-(p-methoxyphenyl)-2-piperidone, and 1-naphthyl-2-piperidone;

ε-caprolactam compounds such as N-methyl-ε-caprolactam, N-ethyl-ε-caprolactam, N-(n-propyl)-ε-caprolactam, N-phenyl-ε-caprolactam, N-(p-methoxyphenyl)-ε-caprolactam, and N-benzyl-ε-caprolactam; and ω-laurylolactam compounds such as N-phenyl-ω-laurylolactam.

The compound represented by Formula (IIIa-3) is preferably a 2-pyrrolidone compound or an ε-caprolactam compound, more preferably a 1-hydrocarbyl-substituted 2-pyrrolidone or an N-hydrocarbyl-substituted ε-caprolactam, still more preferably a 1-alkyl-substituted 2-pyrrolidone, a 1-aryl-substituted 2-pyrrolidone, an N-alkyl-substituted ε-caprolactam, or an N-aryl-substituted ε-caprolactam, particularly preferably 1-phenyl-2-pyrrolidone or N-methyl-ε-caprolactam.

The compounds containing a group represented by Formula (III) can be exemplified by compounds containing a group represented by Formula (III) in which p is 1 and $A^2$ is an amino group, namely, a group represented by the following Formula (IIIb):

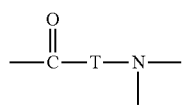

(IIIb)

wherein T represents a $C_{1-20}$ hydrocarbylene group or a $C_{1-20}$ substituted hydrocarbylene group.

The compounds containing a group represented by Formula (IIIb) can be exemplified by benzaldehyde compounds, acetophenone compounds, and benzophenone compounds.

The compounds containing a group represented by Formula (IIIb) can be exemplified by compounds represented by the following Formula (IIIb-1):

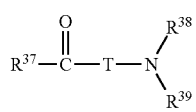

(IIIb-1)

wherein $R^{37}$ represents a hydrogen atom, a $C_{1-10}$ hydrocarbyl group, a $C_{1-10}$ substituted hydrocarbyl group, or a heterocyclic group containing a nitrogen atom and/or an oxygen atom as a heteroatom; $R^{38}$ and $R^{39}$ each independently represent a $C_{1-10}$ group optionally containing at least one atom selected from the group consisting of a nitrogen atom, an oxygen atom, and a silicon atom, $R^{38}$ and $R^{39}$ may be bonded to each other to form a cyclic structure together with the nitrogen atom, and $R^{38}$ and $R^{39}$ may form a single group bonded to the nitrogen via a double bond; and T represents a $C_{1-20}$ hydrocarbylene group or a $C_{1-20}$ substituted hydrocarbylene group.

The hydrocarbyl groups encompassed by $R^{37}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{37}$ can be exemplified by substituted hydrocarbyl groups containing as a substituent at least one group selected from the group consisting of nitrogen atom-containing groups and oxygen atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups.

The heterocyclic group containing a nitrogen atom and/or an oxygen atom as a heteroatom for $R^{37}$ refers to a residue of a heterocyclic compound that contains a nitrogen atom and/or an oxygen atom in the ring. Such groups can be exemplified by a 2-pyridyl group, a 3-pyridyl group, a 4-pyridyl group, and a 2-furyl group.

$R^{37}$ is preferably a hydrogen atom, a $C_{1-10}$ hydrocarbyl group, or a $C_{1-10}$ substituted hydrocarbyl group. The $C_{1-10}$ hydrocarbyl group is preferably a $C_{1-4}$ alkyl group or a phenyl group, particularly preferably a methyl group, an ethyl group, an n-propyl group, an n-butyl group, or a phenyl group. The $C_{1-10}$ substituted hydrocarbyl group is preferably an aryl group containing a nitrogen atom-containing group as a substituent, more preferably a dialkylaminophenyl group or a 4-morpholinophenyl group.

$R^{38}$ and $R^{39}$ in Formula (IIIb-1) may each be a $C_{1-10}$ hydrocarbyl group or a $C_{1-10}$ substituted hydrocarbyl group.

The hydrocarbyl groups encompassed by $R^{38}$ and $R^{39}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{38}$ and $R^{39}$ can be exemplified by substituted hydrocarbyl groups containing as a substituent at least one group selected from the group consisting of nitrogen atom-containing groups and oxygen atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups.

The groups in which $R^{38}$ and $R^{39}$ are bonded to each other can be exemplified by $C_{2-20}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N═CH—.

The single groups bonded to the nitrogen via a double bond, encompassed by $R^{38}$ and $R^{39}$ can be exemplified by $C_{2-12}$ divalent groups optionally containing at least one atom selected from the group consisting of a nitrogen atom and an oxygen atom. Examples include an ethylidene group, a 1-methylpropylidene group, a 1,3-dimethylbutylidene group, a 1-methylethylidene group, and a 4-N,N-dimethylaminobenzylidene group.

$R^{38}$ and $R^{39}$ are each preferably a hydrocarbyl group, more preferably an alkyl group, still more preferably a $C_{1-4}$ alkyl group, particularly preferably a methyl group, an ethyl group, an n-propyl group, or an n-butyl group.

The hydrocarbylene groups encompassed by T can be exemplified by alkylene groups such as methylene, ethylene, trimethylene, tetramethylene, pentamethylene, and hexamethylene groups; and arylene groups such as phenylene, methylphenylene, ethylphenylene, and naphthylene groups.

The substituted hydrocarbylene groups encompassed by T can be exemplified by substituted hydrocarbylene groups containing as a substituent at least one group selected from the group consisting of nitrogen atom-containing groups and oxygen atom-containing groups. The groups containing a nitrogen atom-containing group as a substituent can be exemplified by dialkylaminoalkylene groups such as dimethylaminoethylene and diethylaminoethylene groups; and dialkylaminoarylene groups such as dimethylaminophenylene and diethylaminophenylene groups. The groups containing an oxygen atom-containing group as a substituent can be exemplified by alkoxyalkylene groups such as methoxymethylene, methoxyethylene, ethoxymethylene, and ethoxyethylene groups.

T is preferably a hydrocarbylene group, more preferably an arylene group, still more preferably a phenylene group.

The compounds represented by Formula (IIIb-1) can be exemplified by dialkylamino-substituted benzaldehyde compounds such as 4-dimethylaminobenzaldehyde, 4-diethylaminobenzaldehyde, and 3,5-bis(dihexylamino)benzaldehyde; dialkylamino-substituted acetophenone compounds such as 4-dimethylaminoacetophenone and 4-diethylaminoacetophenone; heterocyclic group-substituted acetophenone compounds such as 4-morpholinoacetophenone, 4'-imidazol-1-yl-acetophenone, and 4-pyrazolylacetophenone; dialkylamino-substituted benzophenone compounds such as 4,4'-bis(dimethylamino)benzophenone, bis(diethylamino)benzophenone, 4-dimethylaminobenzophenone, 4-diethylaminobenzophenone, 3-dimethylaminobenzophenone, and 3-diethylaminobenzophenone; and heterocyclic group-substituted benzophenone compounds such as 4-morpholinobenzophenone, 4'-(imidazol-1-yl)benzophenone, and 4-pyrazolylbenzophenone.

The compound represented by Formula (IIIb-1) is preferably a substituted acetophenone compound or a substituted benzophenone compound, and examples include compounds represented by Formula (IIIb-1-1) below and compounds represented by Formula (IIIb-1-2) below:

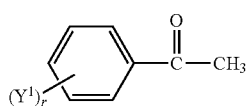

(IIIb-1-1)

wherein r represents an integer of 1 or 2; and $Y^1$ represents a nitrogen atom-containing functional group that is a substituent on the benzene ring, and when plural $Y^1$ groups are present, the plural $Y^1$ groups may be the same as or different from one another,

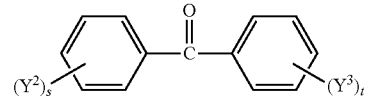

(IIIb-1-2)

wherein s represents an integer of 1 or 2; t represents an integer of 0 to 2; and $Y^2$ and $Y^3$ each represent a nitrogen atom-containing functional group that is a substituent on the benzene ring, and when plural $Y^2$ groups are present, the plural $Y^2$ groups may be the same as or different from one another, and when plural $Y^3$ groups are present, the plural $Y^3$ groups may be the same as or different from one another.

$Y^1$, $Y^2$, and $Y^3$ in Formulas (IIIb-1-1) and (IIIb-1-2) represent nitrogen atom-containing functional groups, and examples include amino, isocyano, cyano, pyridyl, piperidyl, pyrazinyl, pyrimidinyl, pyrrolyl, imidazolyl, pyrazolyl, and morpholino groups. Preferred are dialkylamino, imidazolyl, and morpholino groups. The alkyl group of the dialkylamino group is preferably a $C_{1-10}$ alkyl group.

The compound represented by Formula (IIIb-1) is more preferably a heterocyclic group-substituted acetophenone compound, a dialkylamino-substituted benzophenone compound, or a heterocyclic group-substituted benzophenone compound, particularly preferably 4'-imidazol-1-yl-acetophenone, 4-morpholinoacetophenone, 4-dimethylaminobenzophenone, 4-diethylaminobenzophenone, 4,4'-bis(dimethylamino)benzophenone, 4,4'-bis(diethylamino)benzophenone, or 4-morpholinobenzophenone.

The following explains a compound represented by the following Formula (IV) (modifying agent 3):

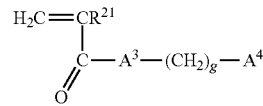

(IV)

wherein g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group containing a nitrogen atom and/or an oxygen atom.

g represents an integer of 1 to 10. In view of achieving balanced improvements in fuel economy and wet-grip performance, g is preferably an integer of 2 or more, while in view of improving economic efficiency in the production, g is preferably an integer of 4 or less. Particularly preferably, g is 3.

$R^{21}$ in Formula (IV) represents a hydrogen atom, a $C_{1-6}$ hydrocarbyl group, or a $C_{1-6}$ substituted hydrocarbyl group.

The hydrocarbyl groups encompassed by $R^{21}$ can be exemplified by alkyl groups such as methyl, ethyl, n-propyl, isopropyl, n-butyl, sec-butyl, and t-butyl groups.

The substituted hydrocarbyl groups encompassed by $R^{21}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups. The groups containing a silicon atom-containing group as a substituent can be exemplified by trialkylsilylalkyl groups such as a trimethylsilylmethyl group; trialkylsilyloxyalkyl groups such as a t-butyldimethylsilyloxymethyl group; and trialkoxysilylalkyl groups such as a trimethoxysilylpropyl group.

The hydrocarbyl group as $R^{21}$ is preferably an alkyl group, more preferably a $C_{1-4}$ alkyl group, still more preferably a methyl group or an ethyl group, further preferably a methyl group. The substituted hydrocarbyl group as $R^{21}$ is preferably an alkoxyalkyl group, more preferably a $C_{1-4}$ alkoxyalkyl group, still more preferably a methoxymethyl group or an ethoxyethyl group, further preferably a methoxymethyl group.

In view of achieving balanced improvements in fuel economy and wet-grip performance and in view of economic efficiency, $R^{21}$ is preferably a hydrogen atom, an alkyl group, or an alkoxyalkyl group, more preferably a hydrogen atom, a $C_{1-4}$ alkyl group, or a alkoxyalkyl group, still more preferably a hydrogen atom, a methyl group, or a methoxymethyl group, further preferably a hydrogen atom or a methyl group.

$A^3$ in Formula (IV) represents an oxygen atom or the following group: —NR²²— where $R^{22}$ represents a hydrogen atom or a $C_{1-10}$ hydrocarbyl group.

The hydrocarbyl groups encompassed by $R^{22}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The hydrocarbyl group as $R^{22}$ is preferably an alkyl group, more preferably a $C_{1-4}$ alkyl group, still more preferably a methyl group or an ethyl group.

$R^{22}$ is preferably a hydrogen atom or an alkyl group, more preferably a hydrogen atom or a $C_{1-4}$ alkyl group, still more preferably a hydrogen atom, a methyl group or an ethyl group, further preferably a hydrogen atom or a methyl group.

$A^4$ in Formula (IV) represents a functional group containing a nitrogen atom and/or an oxygen atom. Examples of the nitrogen atom-containing functional group include amino, isocyano, cyano, pyridyl, piperidyl, piperazinyl, and morpholino groups.

Examples of the oxygen atom-containing functional group include alkoxy groups such as methoxy, ethoxy, n-propoxy, isopropoxy, n-butoxy, sec-butoxy, and t-butoxy groups; alkoxyalkyl groups such as methoxymethyl, methoxyethyl, ethoxymethyl, and ethoxyethyl groups; alkoxyaryl groups such as methoxyphenyl and ethoxyphenyl groups; and alkylene oxide groups such as epoxy and tetrahydrofuranyl groups. Other examples include trialkylsilyloxy groups such as trimethylsilyloxy, triethylsilyloxy, and t-butyldimethylsilyloxy groups. A hydroxy group may also be used.

$A^4$ is preferably a hydroxy group or a group represented by Formula (IVa) below, more preferably a group represented by the following Formula (IVa):

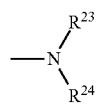

(IVa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

$R^{23}$ and $R^{24}$ in Formula (IVa) may each be a $C_{1-6}$ hydrocarbyl group, a $C_{1-6}$ substituted hydrocarbyl group, or a substituted silyl group.

The hydrocarbyl groups encompassed by $R^{23}$ and $R^{24}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{23}$ and $R^{24}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-containing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by replacing at least one hydrogen atom of an alkyl group by an alkylene oxide group.

The substituted silyl groups encompassed by $R^{23}$ and $R^{24}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{23}$ and $R^{24}$ are bonded to each other can be exemplified by $C_{2-12}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —CH₂CH₂—NH—CH₂— and a group represented by —CH₂CH₂—N=CH—.

The group in which $R^{23}$ and $R^{24}$ are bonded to each other is preferably a nitrogenous group, more preferably a group represented by —CH₂CH₂—NH—CH₂— or a group represented by —CH₂CH₂—N=CH—.

The single groups bonded to the nitrogen via a double bond, encompassed by $R^{23}$ and $R^{24}$ can be exemplified by $C_{2-12}$ divalent groups optionally containing at least one atom selected from the group consisting of a nitrogen atom, an oxygen atom, and a silicon atom. Examples include an ethylidene group, a 1-methylpropylidene group, a 1,3-dimethylbutylidene group, a 1-methylethylidene group, and a 4-N,N-dimethylaminobenzylidene group.

The hydrocarbyl group as $R^{23}$ and $R^{24}$ is preferably an alkyl group, more preferably a $C_{1-4}$ alkyl group, still more preferably a methyl group, an ethyl group, an n-propyl group, or an n-butyl group, further preferably a methyl group or an ethyl group. The substituted hydrocarbyl group as $R^{23}$ and $R^{24}$ is preferably an alkoxyalkyl group, an alkylene oxide group, or an alkylene oxide alkyl group. The substituted silyl group as $R^{23}$ and $R^{24}$ is preferably a trialkylsilyl group or a trialkoxysilyl group, more preferably a trialkylsilyl group, still more preferably a trimethylsilyl group or a triethylsilyl group.

Preferably, $R^{23}$ and $R^{24}$ are bonded to each other to form a nitrogenous group or are each an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The group represented by Formula (IVa) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups. They can also be exemplified by di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Other examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are replaced by two alkylene oxide groups. The term "di(alkylene oxide alkyl)amino group" denotes an amino group in which two hydrogen atoms bonded to the nitrogen atom are replaced by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, and long-term stability and easy availability of the compound, the group represented by Formula (IVa) is preferably an acyclic amino group, more preferably a dialkylamino group, a di(alkylene oxide)amino group, a di(alkylene oxide alkyl) amino group, or a di(trialkylsilyl)amino group.

The compounds represented by Formula (IV) can be exemplified by compounds in which $A^3$ is a secondary amino group, such as acrylamide compounds and methacrylamide compounds.

The acrylamide compounds in which $A^4$ is a nitrogen atom-containing group can be exemplified by
N-(2-dimethylaminoethyl)acrylamide,
N-(2-diethylaminoethyl)acrylamide,
N-(3-dimethylaminopropyl)acrylamide,
N-(3-diethylaminopropyl)acrylamide,
N-(4-dimethylaminobutyl)acrylamide,
N-(4-diethylaminobutyl)acrylamide,
N-(3-morpholinopropyl)acrylamide, and
N-(3-cyanopropyl)acrylamide.

The methacrylamide compounds in which $A^4$ is a nitrogen atom-containing group can be exemplified by
N-(2-dimethylaminoethyl)methacrylamide,
N-(2-diethylaminoethyl)methacrylamide,
N-(3-dimethylaminopropyl)methacrylamide,
N-(3-diethylaminopropyl)methacrylamide,
N-(4-dimethylaminobutyl)methacrylamide,
N-(4-diethylaminobutyl)methacrylamide,
N-(3-morpholinopropyl)methacrylamide, and
N-(3-cyanopropyl)methacrylamide.

The acrylamide compounds in which $A^4$ is an oxygen atom-containing group can be exemplified by
N-(3-methoxypropyl)acrylamide,
N-(3-ethoxypropyl)acrylamide,
N-(propoxymethyl)acrylamide,
N-(butoxymethyl)acrylamide,
N-glycidylacrylamide, and
N-tetrahydrofurfurylacrylamide.

The methacrylamide compounds in which $A^4$ is an oxygen atom-containing group can be exemplified by
N-(3-methoxypropyl)methacrylamide,
N-(3-ethoxypropyl)methacrylamide,
N-(propoxymethyl)methacrylamide,
N-(butoxymethyl)methacrylamide,
N-glycidylmethacrylamide, and
N-tetrahydrofurfurylmethacrylamide.

The acrylamide compounds in which $A^4$ is a group containing nitrogen and oxygen atoms can be exemplified by
N-(3-di(glycidyl)aminopropyl)acrylamide, and
N-(3-di(tetrahydrofurfuryl)aminopropyl)acrylamide.

The methacrylamide compounds in which $A^4$ is a group containing nitrogen and oxygen atoms can be exemplified by
N-(3-di(glycidyl)aminopropyl)methacrylamide, and
N-(3-di(tetrahydrofurfuryl)aminopropyl)methacrylamide.

The compounds represented by Formula (IV) can also be exemplified by compounds in which $A^3$ is an oxygen atom, such as acrylate compounds and methacrylate compounds.

The acrylate compounds in which $A^4$ is a nitrogen atom-containing group can be exemplified by
2-dimethylaminoethyl acrylate,
2-diethylaminoethyl acrylate,
3-dimethylaminopropyl acrylate,
3-diethylaminopropyl acrylate,
4-dimethylaminobutyl acrylate, and
4-diethylaminobutyl acrylate.

The methacrylate compounds in which $A^4$ is a nitrogen atom-containing group can be exemplified by
2-dimethylaminoethyl methacrylate,
2-diethylaminoethyl methacrylate,
3-dimethylaminopropyl methacrylate,
3-diethylaminopropyl methacrylate,
4-dimethylaminobutyl methacrylate, and
4-diethylaminobutyl methacrylate.

The acrylate compounds in which $A^4$ is an oxygen atom-containing group can be exemplified by
2-ethoxyethyl acrylate,
2-propoxyethyl acrylate,
2-butoxyethyl acrylate,
3-methoxypropyl acrylate,
3-ethoxypropyl acrylate,
glycidyl acrylate, and
tetrahydrofurfuryl acrylate.

The methacrylate compounds in which $A^4$ is an oxygen atom-containing group can be exemplified by
2-ethoxyethyl methacrylate,
2-propoxyethyl methacrylate, 2-butoxyethyl methacrylate,
3-methoxypropyl methacrylate,
3-ethoxypropyl methacrylate,
glycidyl methacrylate, and
tetrahydrofurfuryl methacrylate.

The acrylate compounds in which $A^4$ is a group containing nitrogen and oxygen atoms can be exemplified by
3-di(glycidyl)aminopropyl acrylate, and
3-di(tetrahydrofurfuryl)aminopropyl acrylate.

The methacrylate compounds in which $A^4$ is a group containing nitrogen and oxygen atoms can be exemplified by
3-di(glycidyl)aminopropyl methacrylate, and
3-di(tetrahydrofurfuryl)aminopropyl methacrylate.

In view of achieving balanced improvements in fuel economy and wet-grip performance, the compound represented by Formula (IV) is preferably a compound in which $A^4$ is a group represented by Formula (IVa), more preferably a compound in which $A^3$ is an amino group and $A^4$ is a group represented by Formula (IVa), still more preferably a compound in which $A^3$ is a secondary amino group (—NH—) and $A^4$ is a group represented by Formula (IVa).

The compound in which $A^3$ is a secondary amino group and $A^4$ is a group represented by Formula (IVa) is preferably an N-(3-dialkylaminopropyl)acrylamide or an N-(3-dialkylaminopropyl)methacrylamide, more preferably
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

The following explains a silicon compound containing a group represented by Formula (V) below and/or a group represented by Formula (VI) below (modifying agent 4).

(V)

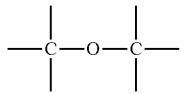

(VI)

Examples of groups containing the group represented by Formula (V) include an amide group, a carboxylic acid ester group, a methacryloyl group, and an acryloyl group. Examples of groups containing the group represented by Formula (VI) include oxydialkylene groups such as oxydimethylene and oxydiethylene groups; and alkylene oxide groups such as epoxy and tetrahydrofuranyl groups.

As used herein, the term "alkylene oxide group" denotes a monovalent group obtained by removing a hydrogen atom from the ring of a cyclic ether compound.

The silicon compound preferably contains a group represented by the following Formula (VIII):

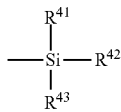

(VIII)

wherein $R^{41}$, $R^{42}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ is a hydrocarbyloxy group.

The hydrocarbyl groups encompassed by $R^{41}$, $R^{42}$, and $R^{43}$ in Formula (VIII) can be exemplified by alkyl groups such as methyl, ethyl, n-propyl, isopropyl, n-butyl, sec-butyl, and tert-butyl groups. The hydrocarbyloxy groups encompassed by $R^{41}$, $R^{42}$, and $R^{43}$ can be exemplified by alkoxy groups such as methoxy, ethoxy, n-propoxy, isopropoxy, n-butoxy, sec-butoxy, and t-butoxy groups.

The hydrocarbyl group as $R^{41}$, $R^{42}$, and $R^{43}$ is preferably an alkyl group, more preferably a $C_{1-3}$ alkyl group, still more preferably a methyl group or an ethyl group. The hydrocarbyloxy group as $R^{41}$, $R^{42}$, and $R^{43}$ is preferably an alkoxy group, more preferably a $C_{1-3}$ alkoxy group, still more preferably a methoxy group or an ethoxy group.

In view of improving fuel economy, preferably at least two of $R^{41}$, $R^{42}$, and $R^{43}$ are hydrocarbyloxy groups, and more preferably the three $R^{41}$, $R^{42}$, and $R^{43}$ groups are hydrocarbyloxy groups.

The silicon compounds containing a group represented by Formula (V) and a group represented by Formula (VIII) can be exemplified by silicon compounds containing a group represented by the following Formula (Va):

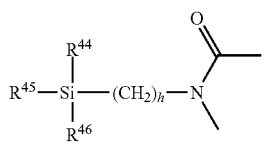

(Va)

wherein h represents an integer of 1 to 10; and $R^{44}$, $R^{45}$, and $R^{46}$ each independently represent a $C_{1-4}$ hydrocarbyl group or a $C_{1-4}$ hydrocarbyloxy group, and at least one of $R^{44}$, $R^{45}$, and $R^{46}$ is a hydrocarbyloxy group.

h represents an integer of 1 to 10. In view of improving fuel economy, h is preferably an integer of 2 or more, while in view of improving economic efficiency in the production, h is preferably an integer of 4 or less. Particularly preferably, h is 3.

Exemplary groups and preferred groups for $R^{44}$, $R^{45}$, and $R^{46}$ are the same as the exemplary groups and preferred groups mentioned above for $R^{41}$, $R^{42}$, and $R^{43}$ in Formula (VIII).

The silicon compounds containing a group represented by Formula (Va) can be exemplified by compounds represented by the following Formula (Va-1) and compounds represented by the following Formula (Va-2):

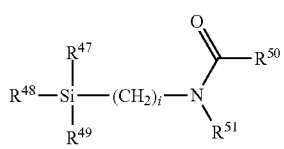

(Va-1)

wherein i represents an integer of 1 to 10; $R^{47}$, $R^{48}$, and $R^{49}$ each independently represent a $C_{1-4}$ hydrocarbyl group or a $C_{1-4}$ hydrocarbyloxy group, and at least one of $R^{47}$, $R^{48}$, and $R^{49}$ is a hydrocarbyloxy group; and $R^{50}$ and $R^{51}$ each independently represent a $C_{1-10}$ hydrocarbyl group, a $C_{1-10}$ substituted hydrocarbyl group, a $C_{1-10}$ hydrocarbyloxy group, or a $C_{1-10}$ substituted hydrocarbyloxy group, and $R^{50}$ and $R^{51}$ may be bonded to each other,

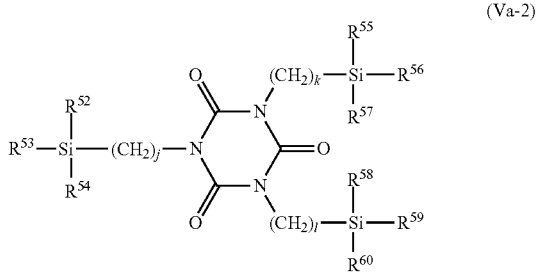

(Va-2)

wherein j, k, and l each independently represent an integer of 1 to 10; and $R^{52}$ to $R^{60}$ each independently represent a $C_{1-4}$ hydrocarbyl group or a $C_{1-4}$ hydrocarbyloxy group, at least one of $R^{52}$, $R^{53}$, and $R^{54}$ is a hydrocarbyloxy group, at least one of $R^{55}$, $R^{56}$, and $R^{57}$ is a hydrocarbyloxy group, and at least one of $R^{58}$, $R^{59}$, and $R^{60}$ is a hydrocarbyloxy group.

In Formula (Va-1), i represents an integer of 1 to 10. In view of achieving balanced improvements in fuel economy and wet-grip performance, i is preferably an integer of 2 or more, while in view of improving economic efficiency in the production, i is preferably an integer of 4 or less. Particularly preferably, i is 3.

The hydrocarbyl groups encompassed by $R^{47}$, $R^{48}$, and $R^{49}$ in Formula (Va-1) can be exemplified by alkyl groups such as methyl, ethyl, n-propyl, isopropyl, n-butyl, sec-butyl, and tert-butyl groups. The hydrocarbyloxy groups encompassed by $R^{47}$, $R^{48}$, and $R^{49}$ can be exemplified by alkoxy groups such as methoxy, ethoxy, n-propoxy, iso-propoxy, n-butoxy, sec-butoxy, and t-butoxy groups.

The hydrocarbyl group as $R^{47}$, $R^{48}$, and $R^{49}$ is preferably an alkyl group, more preferably a $C_{1-3}$ alkyl group, still more preferably a methyl group or an ethyl group. The hydrocarbyloxy group as $R^{47}$, $R^{48}$, and $R^{49}$ is preferably an alkoxy group, more preferably a $C_{1-3}$ alkoxy group, still more preferably a methoxy group or an ethoxy group.

In view of achieving balanced improvements in fuel economy and wet-grip performance, preferably at least two of $R^{47}$, $R^{48}$, and $R^{49}$ are hydrocarbyloxy groups, and more preferably the three $R^{47}$, $R^{48}$, and $R^{49}$ groups are hydrocarbyloxy groups.

The hydrocarbyl groups encompassed by $R^{50}$ and $R^{51}$ can be exemplified by alkyl groups such as methyl, ethyl, n-propyl, isopropyl, n-butyl, sec-butyl, and tert-butyl groups.

The substituted hydrocarbyl groups encompassed by $R^{50}$ and $R^{51}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups. The groups containing a silicon atom-containing group as a substituent can be exemplified by trialkylsilylalkyl groups such as trimethylsilylmethyl and triethylsilylmethyl groups.

The hydrocarbyloxy groups encompassed by $R^{50}$ and $R^{51}$ can be exemplified by alkoxy groups such as methoxy, ethoxy, n-propoxy, isopropoxy, n-butoxy, sec-butoxy, and t-butoxy groups. The substituted hydrocarbyloxy groups encompassed by $R^{50}$ and $R^{51}$ can be exemplified by alkoxyalkoxy groups such as methoxymethoxy, methoxyethoxy, ethoxymethoxy, and ethoxyethoxy groups.

The groups in which $R^{50}$ and $R^{51}$ are bonded to each other can be exemplified by $C_{2-12}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

$R^{50}$ is preferably an alkyl group, more preferably a $C_{1-4}$ alkyl group, still more preferably a methyl group or an ethyl group.

$R^{51}$ is preferably an alkyl group, more preferably a $C_{1-4}$ alkyl group, still more preferably a methyl group or an ethyl group.

In Formula (Va-2), j, k, and l each independently represent an integer of 1 to 10. In view of achieving balanced improvements in fuel economy and wet-grip performance, j, k, and l are each preferably an integer of 2 or more, while in view of improving economic efficiency in the production, j, k, and l are each preferably an integer of 4 or less. Particularly preferably, each of j, k, and l is 3.

The hydrocarbyl groups encompassed by $R^{52}$ to $R^{60}$ in Formula (Va-2) can be exemplified by alkyl groups such as methyl, ethyl, n-propyl, isopropyl, n-butyl, sec-butyl, and tert-butyl groups. The hydrocarbyloxy groups encompassed by $R^{52}$ to $R^{60}$ can be exemplified by alkoxy groups such as methoxy, ethoxy, n-propoxy, isopropoxy, n-butoxy, sec-butoxy, and t-butoxy groups.

The hydrocarbyl group as $R^{52}$ to $R^{60}$ is preferably an alkyl group, more preferably a $C_{1-3}$ alkyl group, still more preferably a methyl group or an ethyl group. The hydrocarbyloxy group as $R^{52}$ to $R^{60}$ is preferably an alkoxy group, more preferably a $C_{1-3}$ alkoxy group, still more preferably a methoxy group or an ethoxy group.

In view of achieving balanced improvements in fuel economy and wet-grip performance, preferably at least two of $R^{52}$, $R^{53}$, and $R^{54}$ are hydrocarbyloxy groups, and more preferably the three $R^{52}$, $R^{53}$, and $R^{54}$ groups are hydrocarbyloxy groups. In view of achieving balanced improvements in fuel economy and wet-grip performance, preferably at least two of $R^{55}$, $R^{56}$, and $R^{57}$ are hydrocarbyloxy groups, and more preferably the three $R^{55}$, $R^{56}$, and $R^{57}$ groups are hydrocarbyloxy groups. In view of achieving balanced improvements in fuel economy and wet-grip performance, preferably at least two of $R^{58}$, $R^{59}$, and $R^{60}$ are hydrocarbyloxy groups, and more preferably the three $R^{58}$, $R^{59}$, and $R^{60}$ groups are hydrocarbyloxy groups.

The compounds represented by Formula (Va-1) can be exemplified by N-alkyl-N-trialkoxysilylalkyl-substituted carboxylic acid amides such as
N-alkyl-N-trialkoxysilylalkyl-acetamides, e.g.,
  N-methyl-N-(trimethoxysilylmethyl)acetamide,
  N-methyl-N-(triethoxysilylmethyl)acetamide,
  N-methyl-N-(2-trimethoxysilylethyl)acetamide,
  N-methyl-N-(2-triethoxysilylethyl)acetamide,
  N-methyl-N-(3-trimethoxysilylpropyl)acetamide, and
  N-methyl-N-(3-triethoxysilylpropyl)acetamide; and
N-alkyl-N-trialkoxysilylalkyl-propionamides, e.g.,
  N-methyl-N-(trimethoxysilylmethyl)propionamide,
  N-methyl-N-(triethoxysilylmethyl)propionamide,
  N-methyl-N-(2-trimethoxysilylethyl)propionamide,
  N-methyl-N-(2-triethoxysilylethyl)propionamide, N-methyl-N-(3-trimethoxysilylpropyl)propionamide, and
N-methyl-N-(3-triethoxysilylpropyl)propionamide.

The compound represented by Formula (Va-1) is preferably an N-alkyl-N-trialkoxysilylalkyl-substituted carboxylic acid amide, more preferably an N-alkyl-N-trialkoxysilylalkyl-propionamide, still more preferably N-methyl-N-(3-trimethoxysilylpropyl)propionamide or N-methyl-N-(3-triethoxysilylpropyl)propionamide.

The compounds represented by Formula (Va-2) can be exemplified by 1,3,5-tris(trialkoxysilylalkyl)-isocyanurates such as
1,3,5-tris(trimethoxysilylmethyl)isocyanurate,
1,3,5-tris(triethoxysilylmethyl)isocyanurate,
1,3,5-tris(trimethoxysilylethyl)isocyanurate,
1,3,5-tris(triethoxysilylethyl)isocyanurate,
1,3,5-tris(3-trimethoxysilylpropyl)isocyanurate, and
1,3,5-tris(3-triethoxysilylpropyl)isocyanurate.

The compound represented by Formula (Va-2) is preferably 1,3,5-tris(3-trimethoxysilylpropyl)isocyanurate or 1,3,5-tris(3-triethoxysilylpropyl)isocyanurate.

The silicon compounds containing a group represented by Formula (VI) and a group represented by Formula (VIII) can be exemplified by silicon compounds represented by the following Formula (VIa):

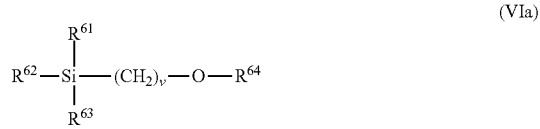

wherein v represents an integer of 1 to 10; $R^{61}$, $R^{62}$, and $R^{63}$ each independently represent a $C_{1-4}$ hydrocarbyl group or a $C_{1-4}$ hydrocarbyloxy group, and at least one of $R^{61}$, $R^{62}$, and $R^{63}$ is a hydrocarbyloxy group; and $R^{64}$ represents a $C_{1-10}$ hydrocarbyl group or a $C_{1-10}$ substituted hydrocarbyl group.

In Formula (VIa), v represents an integer of 1 to 10. In view of achieving balanced improvements in fuel economy and wet-grip performance, v is preferably an integer of 2 or more, while in view of improving economic efficiency in the production, v is preferably an integer of 4 or less. Particularly preferably, v is 3.

The hydrocarbyl groups encompassed by R and $R^{61}$, $R^{62}$, $R^{63}$ in Formula (VIa) can be exemplified by alkyl groups such as methyl, ethyl, n-propyl, isopropyl, n-butyl, sec-butyl, and tert-butyl groups. The hydrocarbyloxy groups encompassed by $R^{61}$, $R^{62}$, and $R^{63}$ can be exemplified by alkoxy groups such as methoxy, ethoxy, n-propoxy, iso-propoxy, n-butoxy, sec-butoxy, and t-butoxy groups.

The hydrocarbyl group as $R^{61}$, $R^{62}$, and $R^{63}$ is preferably an alkyl group, more preferably a $C_{1-3}$ alkyl group, still more preferably a methyl group or an ethyl group. The hydrocarbyloxy group as $R^{61}$, $R^{62}$, and $R^{63}$ is preferably an alkoxy group, more preferably a $C_{1-3}$ alkoxy group, still more preferably a methoxy group or an ethoxy group.

In view of achieving balanced improvements in fuel economy and wet-grip performance, preferably at least two of $R^{61}$, $R^{62}$, and $R^{63}$ are hydrocarbyloxy groups, and more preferably the three $R^{61}$, $R^{62}$, and $R^{63}$ groups are hydrocarbyloxy groups.

The hydrocarbyl groups encompassed by $R^{64}$ can be exemplified by alkyl groups such as methyl, ethyl, n-propyl, isopropyl, n-butyl, sec-butyl, and tert-butyl groups.

The substituted hydrocarbyl groups encompassed by $R^{64}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups; and alkylene oxide alkyl groups such as glycidyl and tetrahydrofurfuryl groups. The groups containing a silicon atom-containing group as a substituent can be exemplified by trialkylsilylalkyl groups such as a trimethylsilylmethyl group.

As used herein, the term "alkylene oxide alkyl group" denotes a group obtained by replacing at least one hydrogen atom of an alkyl group by an alkylene oxide group.

$R^{64}$ is preferably an alkylene oxide alkyl group, more preferably a glycidyl group or a tetrahydrofurfuryl group.

The compounds represented by Formula (VIa) in which $R^{64}$ is an alkyl group can be exemplified by
3-(alkoxy)propyltrialkoxysilanes such as
3-(methoxy)propyltrimethoxysilane,
3-(ethoxy)propyltrimethoxysilane,
3-(n-propoxy)propyltrimethoxysilane,
3-(isopropoxy)propyltrimethoxysilane,
3-(n-butoxy)propyltrimethoxysilane,
3-(sec-butoxy)propyltrimethoxysilane, and
3-(t-butoxy)propyltrimethoxysilane.

The compounds in which $R^{64}$ is an alkylene oxide alkyl group can be exemplified by
glycidoxyalkyltrialkoxysilanes such as
2-glycidoxyethyltrimethoxysilane,
3-glycidoxypropyltrimethoxysilane,
2-glycidoxyethyltriethoxysilane, and
3-glycidoxypropyltriethoxysilane; and
tetrahydrofurfuryloxyalkyltrialkoxysilanes such as
2-tetrahydrofurfuryloxyethyltrimethoxysilane,
3-tetrahydrofurfuryloxypropyltrimethoxysilane,
2-tetrahydrofurfuryloxyethyltriethoxysilane, and
3-tetrahydrofurfuryloxypropyltriethoxysilane.

The compounds in which $R^{64}$ is an alkoxyalkyl group can be exemplified by
3-(alkoxyalkoxy)propyltrialkoxysilanes such as
3-(methoxymethoxy)propyltrimethoxysilane,
3-(methoxyethoxy)propyltrimethoxysilane,
3-(ethoxymethoxy)propyltrimethoxysilane,
3-(ethoxyethoxy)propyltrimethoxysilane,
3-(methoxymethoxy)propyltriethoxysilane,
3-(methoxyethoxy)propyltriethoxysilane,
3-(ethoxymethoxy)propyltriethoxysilane, and
3-(ethoxyethoxy)propyltriethoxysilane.

The compound represented by Formula (VIa) is preferably a compound in which $R^{64}$ is an alkylene oxide alkyl group, more preferably
3-glycidoxypropyltrimethoxysilane,
3-glycidoxypropyltriethoxysilane,
3-tetrahydrofurfuryloxypropyltrimethoxysilane, or
3-tetrahydrofurfuryloxypropyltriethoxysilane.

The silicon compounds containing a group represented by Formula (V), a group represented by Formula (VI), and a group represented by Formula (VIII) can be exemplified by acryloxyalkyltrialkoxysilanes, and methacryloxyalkyltrialkoxysilanes.

The acryloxyalkyltrialkoxysilanes can be exemplified by 3-acryloxypropyltrialkoxysilanes such as
3-acryloxypropyltrimethoxysilane and
3-acryloxypropyltriethoxysilane.

The methacryloxyalkyltrialkoxysilanes can be exemplified by 3-methacryloxypropyltrialkoxysilanes such as 3-methacryloxypropyltrimethoxysilane, and 3-methacryloxypropyltriethoxysilane.

The silicon compounds containing a group represented by Formula (V), a group represented by Formula (VI), and a group represented by Formula (VIII) can also be exemplified by trialkoxysilylalkylsuccinic anhydrides and trialkoxysilylalkylmaleic anhydrides.

The trialkoxysilylalkylsuccinic anhydrides can be exemplified by 3-trialkoxysilylpropylsuccinic anhydrides such as 3-trimethoxysilylpropylsuccinic anhydride and 3-triethoxysilylpropylsuccinic anhydride.

The trialkoxysilylalkylmaleic anhydrides can be exemplified by 3-trialkoxysilylpropylmaleic anhydrides such as 3-trimethoxysilylpropylmaleic anhydride and 3-triethoxysilylpropylmaleic anhydride.

The following explains a compound containing a group represented by the following Formula (VII) (modifying agent 5):

(VII)

wherein w represents an integer of 1 to 11; and $A^5$ represents a nitrogen atom-containing functional group.

w represents an integer of 1 to 11. In view of improving fuel economy, w is preferably an integer of 1 or more, while in view of improving economic efficiency in the production, w is preferably an integer of 4 or less. $A^5$ represents a nitrogen atom-containing functional group, and examples include amino, isocyano, cyano, pyridyl, piperidyl, pyrazinyl, and morpholino groups.

The compounds containing a group represented by Formula (VII) can be exemplified by compounds represented by the following Formula (VII-1):

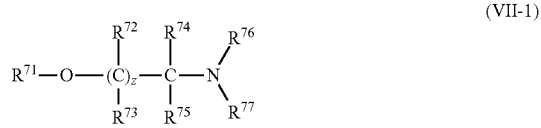

(VII-1)

wherein z represents an integer of 0 to 10; $R^{71}$ represents a $C_{1-5}$ hydrocarbyl group; $R^{72}$, $R^{73}$, $R^{74}$ and $R^{75}$ each independently represent a hydrogen atom, a $C_{1-5}$ hydrocarbyl group, a $C_{1-5}$ substituted hydrocarbyl group, or a $C_{1-5}$ hydrocarbyloxy group, and when plural $R^{72}$ groups and plural $R^{73}$ groups are present, the plural $R^{72}$ groups and the plural $R^{73}$ groups may be the same as or different from one another; and $R^{76}$ and $R^{77}$ each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

In Formula (VII-1), z represents an integer of 0 to 10. In view of improving economic efficiency, z is preferably an integer of 3 or less, more preferably 0.

$R^{71}$ in Formula (VII-1) represents a $C_{1-5}$ hydrocarbyl group. The hydrocarbyl groups encompassed by $R^{71}$ can be exemplified by alkyl groups such as methyl, ethyl, n-propyl, isopropyl, n-butyl, sec-butyl, and t-butyl groups.

The hydrocarbyl group as $R^{71}$ is preferably an alkyl group, more preferably a $C_{1-4}$ alkyl group, still more preferably a methyl group or an ethyl group.

$R^{72}$ to $R^{75}$ in Formula (VII-1) each independently represent a hydrogen atom, a $C_{1-5}$ hydrocarbyl group, a $C_{1-5}$ substituted hydrocarbyl group, or a $C_{1-5}$ hydrocarbyloxy group, and when plural $R^{72}$ groups and plural $R^{73}$ groups are present, the plural $R^{72}$ groups and the plural $R^{73}$ groups may be the same as or different from one another.

The hydrocarbyl groups encompassed by $R^{72}$ to $R^{75}$ can be exemplified by alkyl groups such as methyl, ethyl, n-propyl, isopropyl, n-butyl, sec-butyl, and t-butyl groups.

The substituted hydrocarbyl groups encompassed by $R^{72}$ to $R^{75}$ can be exemplified by substituted hydrocarbyl groups containing as a substituent at least one group selected from the group consisting of nitrogen atom-containing groups and oxygen atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups.

The hydrocarbyloxy groups encompassed by $R^{72}$ to $R^{75}$ can be exemplified by alkoxy groups such as methoxy, ethoxy, n-propoxy, isopropoxy, n-butoxy, sec-butoxy, and t-butoxy groups.

The hydrocarbyl group as $R^{72}$ to $R^{75}$ is preferably an alkyl group, more preferably a $C_{1-4}$ alkyl group, still more preferably a methyl group or an ethyl group.

The substituted hydrocarbyl group as $R^{72}$ to $R^{75}$ is preferably an alkoxyalkyl group, more preferably a $C_{1-4}$ alkoxyalkyl group, still more preferably a methoxymethyl group or an ethoxyethyl group.

The hydrocarbyloxy group as $R^{72}$ to $R^{75}$ is preferably an alkoxy group, more preferably a $C_{1-3}$ alkoxy group, still more preferably a methoxy group or an ethoxy group.

In view of achieving balanced improvements in fuel economy and wet-grip performance and in view of economic efficiency, preferably one of $R^{74}$ and $R^{75}$ is a hydrogen atom. More preferably, one of $R^{74}$ and $R^{75}$ is a hydrogen atom and the other is an alkyl group or an alkoxy group. Still more preferably, one of $R^{74}$ and $R^{75}$ is a hydrogen atom and the other is an alkoxy group, particularly preferably a methoxy group or an ethoxy group.

$R^{76}$ and $R^{77}$ in Formula (VII-1) each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

$R^{76}$ and $R^{77}$ in Formula (VII-1) may each be a $C_{1-6}$ hydrocarbyl group, a $C_{1-6}$ substituted hydrocarbyl group, or a substituted silyl group.

The hydrocarbyl groups encompassed by $R^{76}$ and $R^{77}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{76}$ and $R^{77}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-containing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by replacing at least one hydrogen atom of an alkyl group by an alkylene oxide group.

The substituted silyl groups encompassed by $R^{76}$ and $R^{77}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{76}$ and $R^{77}$ are bonded to each other can be exemplified by $C_{2-12}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N=CH—.

The group in which $R^{76}$ and $R^{77}$ are bonded to each ether is preferably a nitrogenous group, more preferably a group represented by —CH$_2$CH$_2$—NH—CH$_2$— or a group represented by —CH$_2$CH$_2$—N=CH—.

The single groups bonded to the nitrogen via a double bond, encompassed by $R^{76}$ and $R^{77}$ can be exemplified by $C_{2-12}$ divalent groups optionally containing at least one atom selected from the group consisting of a nitrogen atom, an oxygen atom, and a silicon atom. Examples include an ethylidene group, a 1-methylpropylidene group, a 1,3-dimethylbutylidene group, a 1-methylethylidene group, and a 4-N,N-dimethylaminobenzylidene group.

The hydrocarbyl group as $R^{76}$ and $R^{77}$ is preferably an alkyl group, more preferably a $C_{1-4}$ alkyl group, still more preferably a methyl group, an ethyl group, an n-propyl group, or an n-butyl group, further preferably a methyl group or an ethyl group. The substituted hydrocarbyl group as $R^{76}$ and $R^{77}$ is preferably an alkoxyalkyl group, an alkylene oxide group, or an alkylene oxide alkyl group. The substituted silyl group as $R^{76}$ and $R^{77}$ is preferably a trialkylsilyl group or a trialkoxysilyl group, more preferably a trialkylsilyl group, still more preferably a trimethylsilyl group or a triethylsilyl group.

Preferably, $R^{76}$ and $R^{77}$ are bonded to each other to form a nitrogenous group or are each an alkyl group, an alkoxyalkyl group, or a substituted silyl group, more preferably a $C_{1-4}$ alkyl group, still more preferably a methyl group, an ethyl group, an n-propyl group, or an n-butyl group, further preferably a methyl group or an ethyl group.

The amino group in which $R^{76}$ and $R^{77}$ are bonded to the nitrogen atom may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups. They can also be exemplified by di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Other examples include ethylideneamino, 1-methylpropylideneamino, 1,3-dimethylbutylideneamino, 1-methylethylideneamino, and 4-N,N-dimethylaminobenzylideneamino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, and long-term stability and easy availability of the compound, the amino group in which $R^{76}$ and $R^{77}$ are bonded to the nitrogen atom is preferably an acyclic amino group, more preferably a dialkylamino group, still more preferably a dimethylamino group or a diethylamino group.

The compounds represented by Formula (VII-1) can be exemplified by N,N-dialkyl-substituted carboxylic acid amide dialkyl acetal compounds.

The N,N-dialkyl-substituted carboxylic acid amide dialkyl acetal compounds can be exemplified by
N,N-dialkylformamide dialkyl acetals such as
  N,N-dimethylformamide dimethyl acetal,
  N,N-diethylformamide dimethyl acetal,
  N,N-di(n-propyl)formamide dimethyl acetal,
  N,N-dimethylformamide diethyl acetal,
  N,N-diethylformamide diethyl acetal,
  N,N-di(n-propyl)formamide diethyl acetal,
  N,N-dimethylformamide ethyl methyl acetal,
  N,N-diethylformamide ethyl methyl acetal, and
  N,N-di(n-propyl)formamide ethyl methyl acetal;
N,N-dialkylacetamide dialkyl acetals such as
  N,N-dimethylacetamide dimethyl acetal,
  N,N-diethylacetamide dimethyl acetal,
  N,N-di(n-propyl)acetamide dimethyl acetal,
  N,N-dimethylacetamide diethyl acetal,
  N,N-diethylacetamide diethyl acetal,
  N,N-di(n-propyl)acetamide diethyl acetal,
  N,N-dimethylacetamide ethyl methyl acetal,
  N,N-diethylacetamide ethyl methyl acetal, and
  N,N-di(n-propyl)acetamide ethyl methyl acetal; and
N,N-dialkylpropionamide dialkyl acetals such as
  N,N-dimethylpropionamide dimethyl acetal,
  N,N-diethylpropionamide dimethyl acetal,
  N,N-di(n-propyl)propionamide dimethyl acetal,
  N,N-dimethylpropionamide diethyl acetal,
  N,N-diethylpropionamide diethyl acetal,
  N,N-di(n-propyl)propionamide diethyl acetal,
  N,N-dimethylpropionamide ethyl methyl acetal,
  N,N-diethylpropionamide ethyl methyl acetal, and
  N,N-di(n-propyl)propionamide ethyl methyl acetal.

In view of achieving balanced improvements in fuel economy and wet-grip performance, N,N-dialkylformamide dialkyl acetals are preferred among the foregoing, and N,N-dimethylformamide dimethyl acetal, N,N-diethylformamide dimethyl acetal, N,N-dimethylformamide diethyl acetal, and N,N-diethylformamide diethyl acetal are more preferred.

In addition to the conjugated diene-based constituent unit (conjugated diene unit), the conjugated diene polymer may further contain constituent units based on other monomers. Examples of other monomers include aromatic vinyls, vinyl nitriles, and unsaturated carboxylic acid esters. The aromatic vinyls can be exemplified by styrene, α-methylstyrene, vinyltoluene, vinylnaphthalene, divinylbenzene, trivinylbenzene, and divinylnaphthalene. The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the foregoing, and styrene is more preferred.

From a performance stand point, the conjugated diene polymer preferably contains an aromatic vinyl-based constituent unit (aromatic vinyl unit). The aromatic vinyl unit content, based on a total of 100% by mass of the conjugated diene unit and the aromatic vinyl unit, is preferably not less than 10% by mass (with the conjugated diene unit content being not more than 90% by mass), more preferably not less than 15% by mass (with the conjugated diene unit content being not more than 85% by mass). In view of fuel economy, the aromatic vinyl unit content is preferably not more than 50% by mass (with the conjugated diene unit content being not less than 50% by mass), more preferably not more than 45% by mass (with the conjugated diene unit content being not less than 55% by mass).

In view of fuel economy, the conjugated diene polymer preferably has a vinyl bond content of not more than 80 mol %, more preferably not more than 70 mol %, per 100 mol % of the conjugated diene unit. In view of wet-grip performance, the vinyl bond content is preferably not less than 10 mol %, more preferably not less than 15 mol %, still more preferably not less than 20 mol %, particularly preferably not less than 40 mol %. The vinyl bond content can be determined by infrared spectroscopy from the intensity of the absorption around 910 cm$^{-1}$ corresponding to an absorption peak for the vinyl group.

In view of fuel economy, the molecular weight distribution of the conjugated diene polymer is preferably 1 to 5, more preferably 1 to 2. The molecular weight distribution can be determined by measuring the number-average molecular weight (Mn) and the weight-average molecular weight (Mw) by gel permeation chromatography (GPC) and dividing the Mw by the Mn.

The conjugated diene polymer may suitably be produced by a method including the following Step A and Step B.

(Step A): A step of polymerizing monomers including a conjugated diene and a vinyl compound represented by Formula (IX) below in the presence of an alkali metal catalyst in a hydrocarbon solvent to obtain a polymer that contains a constituent unit based on the conjugated diene and a constituent unit based on the vinyl compound represented by Formula (IX) and has an alkali metal derived from the catalyst at at least one polymer chain terminal,

wherein $X^4$, $X^5$, and $X^6$ each independently represent a group represented by Formula (IXa) below, a hydrocarbyl group, or a substituted hydrocarbyl group, and at least one of $X^4$, $X^5$, and $X^6$ is a group represented by the following Formula (IXa):

wherein $R^{81}$ and $R^{82}$ each independently represent a $C_{1-6}$ hydrocarbyl group, a $C_{1-6}$ substituted hydrocarbyl group, a silyl group, or a substituted silyl group, and $R^{81}$ and $R^{82}$ may be bonded to each other to form a cyclic structure together with the nitrogen atom.

(Step B): A step of reacting the polymer obtained in Step A with at least one of the modifying agents 1 to 5.

The alkali metal catalysts that can be used in (Step A) can be exemplified by alkali metals, organoalkali metal compounds, alkali metal/polar compound complexes, and alkali metal-containing oligomers. Examples of alkali metals include lithium, sodium, potassium, rubidium, and cesium. Examples of organoalkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of alkali metal/polar compound complexes include potassium-tetrahydrofuran complexes and potassium-diethoxyethane complexes. Examples of alkali metal-containing oligomers include sodium salts of α-methylstyrene tetramer. Organolithium compounds and organosodium compounds are preferred among the foregoing, and $C_{2-20}$ organolithium compounds or organosodium compounds are more preferred.

The hydrocarbon solvent used in (Step A) is a solvent that does not deactivate the organoalkali metal compound catalyst, and examples include aliphatic hydrocarbons, aromatic hydrocarbons, and alicyclic hydrocarbons. The aliphatic hydrocarbons can be exemplified by propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. The aromatic hydrocarbons can be exemplified by benzene, toluene, xylene, and ethylbenzene. The alicyclic hydrocarbons can be exemplified by cyclopentane and cyclohexane. These may be used alone or two or more thereof may be used in combination. $C_{2-12}$ hydrocarbons are preferred among the foregoing.

In (Step A), monomers including a conjugated diene and a vinyl compound represented by Formula (IX) are polymerized to produce a conjugated diene polymer having an alkali metal derived from the above-described alkali metal catalyst at a polymer chain terminal. Examples of the conjugated diene include 1,3-butadiene, isoprene, 1,3-pentadiene, 2,3-dimethyl-1,3-butadiene, and 1,3-hexadiene. These may be used alone or two or more thereof may be used in combination. In view of ease of availability, 1,3-butadiene or isoprene is preferred among the foregoing.

$X^4$, $X^5$, and $X^6$ in Formula (IX) each independently represent a group represented by Formula (IXa), a hydrocarbyl group, or a substituted hydrocarbyl group, and at least one of $X^4$, $X^5$, and $X^6$ is a group represented by Formula (IXa).

$R^{81}$ and $R^{82}$ in Formula (IXa) each independently represent a $C_{1-6}$ hydrocarbyl group, a $C_{1-6}$ substituted hydrocarbyl group, a silyl group, or a substituted silyl group, and $R^{81}$ and $R^{82}$ may be bonded to each other to form a cyclic structure together with the nitrogen atom.

The $C_{1-6}$ hydrocarbyl groups encompassed by $R^{81}$ and $R^{82}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^{81}$ and $R^{82}$ can be exemplified by substituted hydrocarbyl groups containing as a substituent at least one group selected from the group consisting of nitrogen atom-containing groups, oxygen atom-containing groups, and silicon atom-containing groups. The groups containing a nitrogen atom-containing group as a substituent can be exemplified by dialkylaminoalkyl groups such as dimethylaminoethyl and diethylaminoethyl groups. The groups containing an oxygen atom-containing group as a substituent can be exemplified by alkoxyalkyl groups such as methoxymethyl, methoxyethyl, ethoxymethyl, and ethoxyethyl groups. The groups containing a silicon atom-containing group as a substituent can be exemplified by trialkylsilylalkyl groups such as a trimethylsilylmethyl group.

The substituted silyl groups encompassed by $R^{81}$ and $R^{82}$ can be exemplified by trialkylsilyl groups such as trimethylsilyl, triethylsilyl, and t-butyldimethylsilyl groups.

The groups in which $R^{81}$ and $R^{82}$ are bonded to each other can be exemplified by $C_{1-12}$ divalent groups optionally containing at least one atom selected from the group consisting of a nitrogen atom, an oxygen atom, and a silicon atom. Examples include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{81}$ and $R^{82}$ are bonded to each other is preferably a nitrogenous group, more preferably a group represented by —$CH_2CH_2$—NH—$CH_2$— or a group represented by —$CH_2CH_2$—N=CH—.

The hydrocarbyl group as $R^{81}$ and $R^{82}$ is preferably an alkyl group, more preferably a $C_{1-4}$ alkyl group, still more preferably a methyl group, an ethyl group, an n-propyl group, or an n-butyl group, particularly preferably an ethyl group or an n-butyl group. The substituted hydrocarbyl group as $R^{81}$ and $R^{82}$ is preferably an alkoxyalkyl group, more preferably a $C_{1-4}$ alkoxyalkyl group. The substituted silyl group as $R^{81}$ and $R^{82}$ is preferably a trialkylsilyl group, more preferably a trimethylsilyl group.

Preferably, $R^{81}$ and $R^{82}$ are bonded to each other to form a nitrogenous group or are each an alkyl group, an alkoxyalkyl group, or a substituted silyl group, more preferably an alkyl group, still more preferably a $C_{1-4}$ alkyl group, further preferably a methyl group, an ethyl group, an n-propyl group, or an n-butyl group.

The group represented by Formula (IXa) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of economic efficiency and ease of availability, the group represented by Formula (IXa) is preferably an acyclic amino group, more preferably a dialkylamino group, still more preferably a dialkylamino group having a $C_{1-4}$ alkyl substituent, further preferably a dimethylamino group, a diethylamino group, a di(n-propyl)amino group, or a di(n-butyl)amino group.

The hydrocarbyl groups encompassed by $X^4$, $X^5$, and $X^6$ in Formula (IX) can be exemplified by alkyl groups such as methyl, ethyl, n-propyl, isopropyl, n-butyl, sec-butyl, and tert-butyl groups. The substituted hydrocarbyl groups can be exemplified by alkoxyalkyl groups such as methoxymethyl, ethoxymethyl, methoxyethyl, and ethoxyethyl groups.

The hydrocarbyl group as $X^4$, $X^5$, and $X^6$ is preferably an alkyl group, more preferably a $C_{1-4}$ alkyl group, still more preferably a methyl group or an ethyl group. The substituted hydrocarbyl group as $X^4$, $X^5$, and $X^6$ is preferably an alkoxyalkyl group, more preferably a $C_{1-4}$ alkoxyalkyl group.

The hydrocarbyl group or substituted hydrocarbyl group as $X^4$, $X^5$, and $X^6$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, further preferably a methyl group or an ethyl group.

At least one of $X^4$, $X^5$, and $X^6$ in Formula (IX) is a group represented by Formula (IXa). Preferably at least two of $X^4$, $X^5$, and $X^6$ are groups represented by Formula (IXa). More preferably two of $X^4$, $X^5$, and $X^6$ are groups represented by Formula (IXa).

Examples of the vinyl compound represented by Formula (IX) used in (Step A) include compounds in which one of $X^4$, $X^5$, and $X^6$ is an acyclic amino group represented by Formula (IXa) and the other two are each a hydrocarbyl group or a substituted hydrocarbyl group, e.g., (dialkylamino)dialkylvinylsilanes, {di(trialkylsilyl)amino}dialkylvinylsilanes, and (dialkylamino)dialkoxyalkylvinylsilanes.

The (dialkylamino)dialkylvinylsilanes can be exemplified by
 (dimethylamino)dimethylvinylsilane,
 (ethylmethylamino)dimethylvinylsilane,
 (diethylamino)dimethylvinylsilane,
 (ethyl-n-propylamino)dimethylvinylsilane, (ethylisopropylamino)dimethylvinylsilane,
(di(n-propyl)amino)dimethylvinylsilane,
(diisopropylamino)dimethylvinylsilane,
(n-butyl-n-propylamino)dimethylvinylsilane,
(di(n-butyl)amino)dimethylvinylsilane,
(dimethylamino)diethylvinylsilane,
(ethylmethylamino)diethylvinylsilane,
(diethylamino)diethylvinylsilane,
(ethyl-n-propylamino)diethylvinylsilane,
(ethylisopropylamino)diethylvinylsilane,
(di(n-propyl)amino)diethylvinylsilane,
(diisopropylamino)diethylvinylsilane,
(n-butyl-n-propylamino) diethylvinylsilane,
(di(n-butyl)amino)diethylvinylsilane,
(dimethylamino)dipropylvinylsilane,
(ethylmethylamino)dipropylvinylsilane,
(diethylamino)dipropylvinylsilane,
(ethyl-n-propylamino)dipropylvinylsilane,
(ethylisopropylamino)dipropylvinylsilane,
(di(n-propyl)amino)dipropylvinylsilane,
(diisopropylamino)dipropylvinylsilane,
(n-butyl-n-propylamino)dipropylvinylsilane,
(di(n-butyl)amino)dipropylvinylsilane,
(dimethylamino)dibutylvinylsilane,
(ethylmethylamino)dibutylvinylsilane,
(diethylamino)dibutylvinylsilane,
(ethyl-n-propylamino)dibutylvinylsilane,
(ethylisopropylamino)dibutylvinylsilane,
(di(n-propyl)amino)dibutylvinylsilane,
(diisopropylamino)dibutylvinylsilane,
(n-butyl-n-propylamino)dibutylvinylsilane, and
(di(n-butyl)amino)dibutylvinylsilane.

The {di(trialkylsilyl)amino}dialkylvinylsilanes can be exemplified by
{di(trimethylsilyl)amino}dimethylvinylsilane,
{di(t-butyldimethylsilyl)amino}dimethylvinylsilane,
{di(trimethylsilyl)amino}diethylvinylsilane, and
{di(t-butyldimethylsilyl)amino}diethylvinylsilane.

The (dialkylamino)dialkoxyalkylvinylsilanes can be exemplified by
(dimethylamino)dimethoxymethylvinylsilane,
(dimethylamino)dimethoxyethylvinylsilane,
(dimethylamino) diethoxymethylvinylsilane,
(dimethylamino) diethoxyethylvinylsilane,
(diethylamino)dimethoxymethylvinylsilane,
(diethylamino)dimethoxyethylvinylsilane,
(diethylamino) diethoxymethylvinylsilane, and
(diethylamino) diethoxyethylvinylsilane.

Examples of compounds in which two of $X^4$, $X^5$, and $X^6$ are acyclic amino groups represented by Formula (IXa) and the other one is a hydrocarbyl group or a substituted hydrocarbyl group include
bis(dialkylamino)alkylvinylsilanes,
bis{di(trialkylsilyl)amino}alkylvinylsilanes, and
bis(dialkylamino)alkoxyalkylvinylsilanes.

The bis(dialkylamino)alkylvinylsilanes can be exemplified by
bis(dimethylamino)methylvinylsilane,
bis(ethylmethylamino)methylvinylsilane,
bis(diethylamino)methylvinylsilane,
bis(ethyl-n-propylamino)methylvinylsilane,
bis(ethylisopropylamino)methylvinylsilane,
bis(di(n-propyl)amino)methylvinylsilane,
bis(diisopropylamino)methylvinylsilane,
bis(n-butyl-n-propylamino)methylvinylsilane,
bis(di(n-butyl)amino)methylvinylsilane,
bis(dimethylamino)ethylvinylsilane,
bis(ethylmethylamino)ethylvinylsilane,
bis(diethylamino)ethylvinylsilane,
bis(ethyl-n-propylamino)ethylvinylsilane,
bis(ethylisopropylamino)ethylvinylsilane,
bis(di(n-propyl)amino)ethylvinylsilane,
bis(diisopropylamino)ethylvinylsilane,
bis(n-butyl-n-propylamino)ethylvinylsilane,
bis(di(n-butyl)amino)ethylvinylsilane,
bis(dimethylamino)propylvinylsilane,
bis(ethylmethylamino)propylvinylsilane,
bis(diethylamino)propylvinylsilane,
bis(ethyl-n-propylamino)propylvinylsilane,
bis(ethylisopropylamino)propylvinylsilane,
bis(di(n-propyl)amino)propylvinylsilane,
bis(diisopropylamino)propylvinylsilane,
bis(n-butyl-n-propylamino)propylvinylsilane,
bis(di(n-butyl)amino)propylvinylsilane,
bis(dimethylamino)butylvinylsilane,
bis(ethylmethylamino)butylvinylsilane,
bis(diethylamino)butylvinylsilane,
bis(ethyl-n-propylamino)butylvinylsilane,
bis(ethylisopropylamino)butylvinylsilane,
bis(di(n-propyl)amino)butylvinylsilane,
bis(diisopropylamino)butylvinylsilane,
bis(n-butyl-n-propylamino)butylvinylsilane, and
bis(di(n-butyl)amino)butylvinylsilane.

The bis{di(trialkylsilyl)amino}alkylvinylsilanes can be exemplified by
bis{di(trimethylsilyl)amino}methylvinylsilane,
bis{di(t-butyldimethylsilyl)amino}methylvinylsilane,
bis{di(trimethylsilyl)amino}ethylvinylsilane, and
bis{di(t-butyldimethylsilyl)amino}ethylvinylsilane.

The bis(dialkylamino)alkoxyalkylvinylsilanes can be exemplified by
bis(dimethylamino)methoxymethylvinylsilane,
bis(dimethylamino)methoxyethylvinylsilane,
bis(dimethylamino)ethoxymethylvinylsilane,
bis(dimethylamino)ethoxyethylvinylsilane,
bis(diethylamino)methoxymethylvinylsilane,
bis(diethylamino)methoxyethylvinylsilane,
bis(diethylamino)ethoxymethylvinylsilane, and
bis(diethylamino)ethoxyethylvinylsilane.

Examples of compounds in which the three $X^4$, $X^5$, and $X^6$ groups are acyclic amino groups represented by Formula (IXa) include tri(dialkylamino)vinylsilanes. Examples include tri(dimethylamino)vinylsilane,
tri(ethylmethylamino)vinylsilane,
tri(diethylamino)vinylsilane,
tri(ethylpropylamino)vinylsilane,
tri(dipropylamino)vinylsilane, and
tri(butylpropylamino)vinylsilane.

Examples of compounds in which two of $X^4$, $X^5$, and $X^6$ are cyclic amino groups represented by Formula (IXa) and the other one is a hydrocarbyl group or a substituted hydrocarbyl group include
bis(morpholino)methylvinylsilane,
bis(piperidino)methylvinylsilane,
bis(4,5-dihydroimidazolyl)methylvinylsilane, and
bis(hexamethyleneimino)methylvinylsilane.

The vinyl compound represented by Formula (IX) in which two of $X^4$, $X^5$, and $X^6$ are groups represented by Formula (IXa) is preferably a vinyl compound in which two of $X^4$, $X^5$, and $X^6$ are acyclic amino groups. In view of fuel economy and wet-grip performance, the vinyl compound is more preferably a bis(dialkylamino)alkylvinylsilane, still more preferably bis(dimethylamino)methylvinylsilane, bis(diethylamino)methylvinylsilane, bis(di(n-propyl)amino)

methylvinylsilane, or bis(di(n-butyl)amino)methylvinylsilane. Among the foregoing, bis(diethylamino)methylvinylsilane or bis(di(n-butyl)amino)methylvinylsilane is preferred in view of easy availability of the compound.

In (Step A), the conjugated diene and the vinyl compound represented by Formula (IX) in combination with other monomers may be polymerized. Examples of other monomers include aromatic vinyls, vinyl nitriles, and unsaturated carboxylic acid esters. The aromatic vinyls can be exemplified by styrene, α-methylstyrene, vinyltoluene, vinylnaphthalene, divinylbenzene, trivinylbenzene, and divinylnaphthalene. The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the foregoing, and styrene is more preferred.

In (Step A), polymerization may be carried out in the presence of an agent that controls the vinyl bond content of the conjugated diene unit, an agent that controls the distribution of the conjugated diene unit and constituent units based on monomers other than the conjugated diene in the conjugated diene polymer chain, or the like (hereinafter, these agents are collectively referred to as "regulators"). These agents can be exemplified by ether compounds, tertiary amines, and phosphine compounds. The ether compounds can be exemplified by cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. The tertiary amines can be exemplified by triethylamine, tripropylamine, tributylamine, N,N,N',N'-tetramethylethylenediamine, N,N-diethylaniline, pyridine, and quinoline. The phosphine compounds can be exemplified by trimethylphosphine, triethylphosphine, and triphenylphosphine. These may be used alone or two or more thereof may be used in combination.

The polymerization temperature in (Step A) is usually 25° C. to 100° C., preferably 35° C. to 90° C., more preferably 50° C. to 80° C. The polymerization time is usually 10 minutes to 5 hours.

In (Step B), the amount of the modifying agent(s) 1 to 5 to be contacted with the polymer prepared in Step A is usually 0.1 to 3 moles, preferably 0.5 to 2 moles, more preferably 0.7 to 1.5 moles, further preferably 1 to 1.5 moles, per mole of the alkali metal derived from the organoalkali metal catalyst.

In (Step B), the temperature for the contact between the polymer prepared in Step A and at least one of the modifying agents 1 to 5 is usually 25° C. to 100° C., preferably 35° C. to 90° C., more preferably 50° C. to 80° C. The contact time is usually 60 seconds to 5 hours, preferably 5 minutes to 1 hour, more preferably 15 minutes to 1 hour.

In the method for producing the conjugated diene polymer, a coupling agent may optionally be added to the hydrocarbon solution of the conjugated diene polymer at any time from the initiation of polymerization of the monomers in the presence of the alkali metal catalyst until the termination of polymerization. Examples of the coupling agent include compounds represented by the following Formula (X):

$$R^{91}{}_a ML_{4-a} \qquad (X)$$

wherein $R^{91}$ represents an alkyl group, an alkenyl group, a cycloalkenyl group, or an aromatic residue; M represents a silicon atom or a tin atom; L represents a halogen atom or a hydrocarbyloxy group; and a represents an integer of 0 to 4.

The term "aromatic residue" denotes a monovalent group obtained by removing hydrogen bonded to the aromatic ring from an aromatic hydrocarbon.

The coupling agents represented by Formula (X) can be exemplified by silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

Preferably, a is an integer of 0 to 2.

In view of processability of the conjugated diene polymer, the amount of coupling agent is preferably not less than 0.03 moles, more preferably not less than 0.05 moles, per mole of the alkali metal derived from the alkali metal catalyst. In view of fuel economy, the amount is preferably not more than 0.4 moles, more preferably not more than 0.3 moles.

The conjugated diene polymer can be recovered from the hydrocarbon solution of the conjugated diene polymer by known methods, such as, for example, (1) by adding a coagulant to the hydrocarbon solution of the conjugated diene polymer; or (2) adding steam to the hydrocarbon solution of the conjugated diene polymer. The recovered conjugated diene polymer may be dried using known driers such as a band drier or an extrusion drier.

In the method for producing the conjugated diene polymer, a treatment is preferably performed in which the group represented by Formula (Ia) in the polymer is replaced by a hydroxy group by hydrolysis or the like. This treatment may be carried out on the polymer alone or a composition containing the polymer. The hydrolysis may be carried out by known methods, such as steam stripping. The above treatment can convert $X^1$, $X^2$, and $X^3$ in Formula (I) into hydroxy groups, thereby resulting in balanced improvements in fuel economy and wet-grip performance.

The conjugated diene polymer can be used in the rubber component of the rubber composition in the present invention, and is preferably used in combination with other rubber materials, additives, or the like.

Examples of other rubber materials that can be used in the rubber component include commonly used diene rubbers such as styrene-butadiene copolymer rubber (SBR), polybutadiene rubber (BR), butadiene-isoprene copolymer rubber, and butyl rubber. Other examples include natural rubber (NR), ethylene-propylene copolymers, and ethylene-octene copolymers. Two or more types of these rubber materials may be used in combination. In view of achieving balanced improvements in fuel economy and wet-grip performance, NR and/or BR are preferred among these, and a combination of NR and BR is more preferred.

The amount of the conjugated diene polymer, based on 100% by mass of the rubber component, is not less than 5% by mass, preferably not less than 10% by mass, more preferably not less than 30% by mass, still more preferably not less than 50% by mass. If the amount of the conjugated diene polymer is less than 5% by mass, the effect of improving fuel economy tends not to be obtained easily. The amount of the conjugated diene polymer is preferably not more than 90% by mass, more preferably not more than 80% by mass, still more preferably not more than 70% by mass.

If the amount of the conjugated diene polymer exceeds 90% by mass, performance tends to be reduced and cost tends to be increased.

Any NR may be used, including those commonly used in the tire industry, such as SIR20, RSS#3, TSR20, deproteinized natural rubber (DPNR), and highly purified natural rubber (HPNR).

The amount of NR, based on 100% by mass of the rubber component, is preferably not less than 5% by mass, more preferably not less than 10% by mass, still more preferably not less than 15% by mass. Performance tends to be reduced when the amount of NR is less than 5% by mass. The amount of NR is preferably not more than 70% by mass, more preferably not more than 60% by mass, still more preferably not more than 30% by mass. Wet-grip performance tends to be reduced when the amount of NR is more than 70% by mass.

Any BR may be used, including those commonly used in the tire industry, such as high-cis BR e.g. BR1220 produced by Zeon Corporation and BR130B and BR150B produced by Ube Industries, Ltd., and BR containing syndiotactic polybutadiene crystals e.g. VCR412 and VCR617 produced by Ube Industries, Ltd.

The amount of BR, based on 100% by mass of the rubber component, is preferably not less than 5% by mass, more preferably not less than 10% by mass, still more preferably not less than 15% by mass. Performance tends to be reduced when the amount of BR is less than 5% by mass. The amount of BR is preferably not more than 60% by mass, more preferably not more than 50% by mass, still more preferably not more than 35% by mass, further preferably not more than 30% by mass, particularly preferably not more than 25% by mass. Wet-grip performance tends to be reduced when the amount of BR is more than 60% by mass.

The combined amount of NR and BR, based on 100% by mass of the rubber component, is preferably not less than 10% by mass, more preferably not less than 20% by mass, still more preferably not less than 30% by mass. Performance tends to be reduced when the combined amount is less than 10% by mass. The combined amount is preferably not more than 70% by mass, more preferably not more than 50% by mass. Wet-grip performance tends to be reduced when the combined amount is more than 70% by mass.

The rubber composition in the present invention characteristically contains silica as a reinforcing agent. The amount (content) of silica, relative to 100 parts by mass of the rubber component, is 5 to 150 parts by mass. Performance tends to be unsatisfactory when the amount of silica is less than 5 parts by mass, while processability tends to be deteriorated when the amount of silica exceeds 150 parts by mass. The amount of silica is preferably not less than 10 parts by mass, more preferably not less than 15 parts by mass, still more preferably not less than 45 parts by mass, particularly preferably not less than 60 parts by mass, while it is preferably not more than 120 parts by mass, more preferably not more than 100 parts by mass, still more preferably not more than 80 parts by mass.

The silica may be used alone, or two or more types of silicas may be used in combination.

The proportion of silica, based on a total of 100% by mass of silica and carbon black, is preferably not less than 60% by mass, more preferably not less than 85% by mass, while it is preferably not more than 98% by mass, more preferably not more than 95% by mass. Balanced improvements in fuel economy and wet-grip performance can be achieved at high levels when the proportion of silica is within the above range.

The silica preferably has a nitrogen adsorption specific surface area ($N_2SA$) of not less than 40 m$^2$/g, more preferably not less than 50 m$^2$/g, still more preferably not less than 60 m$^2$/g, particularly preferably not less than 150 m$^2$/g. The $N_2SA$ is preferably not more than 400 m$^2$/g, more preferably not more than 360 m$^2$/g, still more preferably not more than 300 m$^2$/g, particularly preferably not more than 200 m$^2$/g. If the silica has a nitrogen adsorption specific surface area of less than 40 m$^2$/g, its reinforcing effect tends to be small and performance tends to be reduced. The silica having a $N_2SA$ of more than 400 m$^2$/g tends to be poorly dispersed and therefore hysteresis loss tends to increase so that fuel economy can be reduced.

The nitrogen adsorption specific surface area of silica is measured by the BET method in accordance with ASTM D3037-81.

The rubber composition in the present invention contains a silane coupling agent represented by Formula (1) below as a silane coupling agent. When the silane coupling agent represented by Formula (1) is contained together with the conjugated diene polymer and silica, the silica can be well dispersed so that fuel economy and wet-grip performance can be markedly improved.

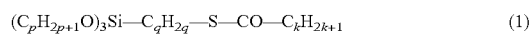

$$(C_pH_{2p+1}O)_3Si—C_qH_{2q}—S—CO—C_kH_{2k+1} \qquad (1)$$

In the formula, p represents an integer of 1 to 3; q represents an integer of 1 to 5; and k represents an integer of 5 to 12.

p is an integer of 1 to 3, preferably 2. If p is an integer of 4 or more, the coupling reaction tends to be retarded.

q is an integer of 1 to 5, preferably an integer of 2 to 4, still more preferably 3. If q is an integer of 0 or 6 or more, the silane coupling agent is difficult to synthesize.

k is an integer of 5 to 12, preferably an integer of 5 to 10, more preferably an integer of 6 to 8, still more preferably 7.

Examples of the silane coupling agent represented by Formula (1) include NXT produced by GE Toshiba Silicone Co., Ltd. The silane coupling agent represented by Formula (1) may be used alone, or two or more types thereof may be used in combination.

The amount of the silane coupling agent represented by Formula (1), relative to 100 parts by mass of silica, is preferably 0.05 to 30 parts by mass. If the amount is less than 0.05 parts by mass, then silica is difficult to sufficiently disperse, so that fuel economy may be deteriorated. Also, if the amount exceeds 30 parts by mass, effects commensurate with an increase in the cost tend not to be obtained. The amount of the silane coupling agent is more preferably not less than 0.1 parts by mass, still more preferably not less than 2 parts by mass, particularly preferably not less than 4 parts by mass, while it is more preferably not more than 20 parts by mass, still more preferably not more than 16 parts by mass, particularly preferably not more than 12 parts by mass.

The rubber composition in the present invention may contain additives other than the agents described above. Known additives may be used and examples include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organoperoxides; fillers such as carbon black, calcium carbonate, talc, alumina, clay, aluminum hydroxide, and mica; processing aids such as extender oil and lubricants; and antioxidants.

Examples of the carbon black include furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. These may be used alone or two or more thereof may be used in combination. In view of achieving balanced improvements in fuel economy and wet-grip performance at high levels, the amount of carbon black, relative to 100 parts by mass of the rubber component, is preferably not less than 1 part by mass, more preferably not less than 3 parts by mass, while it is preferably not more than 60 parts by mass, more preferably not more than 50 parts by mass, still more preferably not more than 30 parts by mass, particularly preferably not more than 10 parts by mass.

The carbon black preferably has a nitrogen adsorption specific surface area ($N_2SA$) of not less than 5 $m^2/g$, more preferably not less than 30 $m^2/g$, still more preferably not less than 50 $m^2/g$, particularly preferably not less than 70 $m^2/g$, but preferably not more than 250 $m^2/g$, more preferably not more than 200 $m^2/g$, still more preferably not more than 150 $m^2/g$. Moreover, the carbon black preferably has a dibutyl phthalate (DBP) absorption of not less than 5 mL/100 g, more preferably not less than 80 mL/100 g, but preferably not more than 300 mL/100 g, more preferably not more than 180 mL/100 g. If the carbon black has a $N_2SA$ or DBP absorption of less than the corresponding lower limit of the range, the reinforcing effect tends to be reduced. If the $N_2SA$ or DBP absorption is more than the corresponding upper limit of the range, the carbon black tends to be poorly dispersed and therefore hysteresis loss tends to increase so that fuel, economy can be reduced. The nitrogen adsorption specific surface area is measured in accordance with ASTM D4820-93. The DBP absorption is measured in accordance with ASTM D2414-93. Applicable commercial products are available under the trade name Diablack N339 from Mitsubishi Chemical Corporation, SEAST 6, SEAST 7HM, and SEAST KH from Tokai Carbon Co., Ltd., and CK3 and Special Black 4A from Evonik Degussa, and the like.

Examples of the extender oil include aromatic mineral oils (viscosity-gravity constant (VGC value)=0.900 to 1.049), naphthenic mineral oils (VGC value=0.850 to 0.899), and paraffinic mineral oils (VGC value=0.790 to 0.849). The polycyclic aromatic content in the extender oil is preferably less than 3% by mass, more preferably less than 1% by mass. The polycyclic aromatic content is measured according to the Institute of Petroleum (IP, U.K.) 346/92 method. Moreover, the aromatic content (CA) in the extender oil is preferably not less than 20% by mass. Two or more types of extender oils may be used in combination.

Examples of the vulcanization accelerator include thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, di-ortho-tolylguanidine, and ortho-tolylbiguanidine. The amount thereof is preferably 0.1 to 5 parts by mass, more preferably 0.2 to 4 parts by mass, relative to 100 parts by mass of the rubber component.

Known methods can be used to prepare a rubber composition from the conjugated diene polymer and other rubber materials, additives, or the like. For example, a method may be employed in which the components are kneaded using a known mixer such as a roll mill or a Banbury mixer.

With regard to the kneading conditions for mixing additives other than vulcanizing agents and vulcanization accelerators, the kneading temperature is usually 50° C. to 200° C., preferably 80° C. to 190° C., and the kneading time is usually 30 seconds to 30 minutes, preferably 1 to 30 minutes.

In mixing a vulcanizing agent and/or a vulcanization accelerator, the kneading temperature is usually not more than 100° C. and preferably ranges from room temperature to 80° C. Moreover, the composition in which the vulcanizing agent and/or vulcanization accelerator have been mixed is usually subjected to a vulcanizing treatment such as press vulcanization before use. The vulcanization temperature is usually 120° C. to 200° C., preferably 140° C. to 180° C.

The rubber composition in the present invention is excellent in the balance between fuel economy and wet-grip performance, and can produce the effects of markedly improving these properties.

The rubber composition in the present invention can be suitably used in various tire components, and especially in treads.

The pneumatic tire of the present invention can be prepared by usual methods using the above-described rubber composition. Specifically, the rubber composition that contains various additives as necessary, before vulcanization, is extruded and processed into the shape of a tire tread or the like and is then formed in a conventional manner and assembled with other tire components on a tire building machine to build an unvulcanized tire. This unvulcanized tire is heated and pressurized in a vulcanizer to form a pneumatic tire of the present invention.

The pneumatic tire of the present invention can be suitably used as a tire for passenger vehicles and a tire for trucks and buses (heavy-load tire).

EXAMPLES

The present invention is described with reference to examples below.

The physical properties were evaluated by the following methods. In the physical property evaluations below, Comparative Example 3 was taken as a standard comparative example in Table 6; Comparative Example 6 was taken as a standard comparative example in Table 7; Comparative Example 9 was taken as a standard comparative example in Table 8; Comparative Example 12 was taken as a standard comparative example in Table 9; and Comparative Example 15 was taken as a standard comparative example in Table 10.

1. Styrene Unit Content (Unit: % by Mass)

The styrene unit content of polymers was determined from the refractive index in accordance with JIS K6383 (1995).

2. Vinyl Bond Content (Unit: Mol %)

The vinyl bond content of polymers was determined by infrared spectroscopy from the intensity of the absorption around 910 $cm^{-1}$ corresponding to an absorption peak for the vinyl group.

3. Molecular Weight Distribution (Mw/Mn)

The weight-average molecular weight (Mw) and the number-average molecular weight (Mn) of polymers were measured by gel permeation chromatography (GPC) under the conditions (1) to (8) described below. The molecular weight distribution (Mw/Mn) of the polymers was determined from the Mw and Mn values.

(1) Instrument: HLC-8020 produced by Tosoh Corporation
(2) Separation columns: 2×GMH-XL in series, produced by Tosoh Corporation (3) Measurement temperature: 40° C.
(4) Carrier: tetrahydrofuran
(5) Flow rate: 0.6 mL/minute
(6) Quantity of injection: 5 μL
(7) Detector: differential refractometer
(8) Molecular weight standards: polystyrene standards 4. Tan δ

Strip test samples with a width of 1 mm or 2 mm and a length of 40 mm were punched out of vulcanized rubber composition sheets for testing. The tan δ of the test samples was determined with a spectrometer produced by Ueshima Seisakusho Co., Ltd. at a dynamic strain amplitude of 1%, a frequency of 10 Hz, and a temperature of 50° C. The reciprocal of the tan δ value was expressed as an index with the standard comparative example set equal to 100. A higher index indicates lower rolling resistance, which in turn indicates better fuel economy.

5. Rolling Resistance

Rolling resistance was measured using a rolling resistance tester by running test tires with a 15×6JJ rim at an internal pressure of 230 kPa, a load of 3.43 kN, and a speed of 80 km/h., and expressed as an index with the standard comparative example set equal to 100. A higher index indicates lower rolling resistance, which in turn indicates better fuel economy.

6. Wet-Grip Performance

The prepared test tires were mounted on all the wheels of a vehicle (front-engine, front-wheel-drive car of 2000 cc displacement made in Japan), and braking distance with an initial speed of 100 km/h was measured on a wet asphalt road. Using the equation below, the wet-skid performance (wet-grip performance) of the tires of each formulation was expressed as an index with the wet-grip performance index of the standard comparative example set equal to 100. A higher index indicates better wet-grip performance.

(Wet-grip Performance index)=(Braking distance of standard comparative example)/(Braking distance of each formulation)×100

Production Example 1

Synthesis of Polymer 1

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 11.1 mmol of bis(diethylamino)methylvinylsilane in cyclohexane and 13.1 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 11.1 mmol of 3-diethylaminopropyltriethoxysilane was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 1 was recovered from the polymer solution by steam stripping. Table 1 shows the evaluation results of Polymer 1. The content of the constituent unit represented by Formula (I) in the polymer, as calculated from the amounts of raw materials introduced and fed into the polymerization reactor, was 0.006 mmol/g-polymer per unit mass of the polymer.

Production Example 2

Synthesis of Polymer 2

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 13.1 mmol of n-butyllithium in n-hexane was introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 2 was recovered from the polymer solution by steam stripping. Table 1 shows the evaluation results of Polymer 2. Since no compound represented by Formula (IX) was used in the synthesis of Polymer 2, Polymer 2 contained no constituent unit represented by Formula (I).

TABLE 1

| | Polymer 1 | Polymer 2 |
|---|---|---|
| Styrene unit content (% by mass) | 25 | 24 |
| Vinyl bond content (mol %) | 59 | 58 |
| Molecular weight distribution (Mw/Mn) | 1.3 | 1.1 |

Production Example 3

Synthesis of Polymer 3

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 11.0 mmol of bis(diethylamino)methylvinylsilane in cyclohexane and 14.3 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 11.0 mmol of 1,3-dimethyl-2-imidazolidinone was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 3 was recovered from the polymer solution by steam stripping. Table 2 shows the evaluation results of Polymer 3. The content of the constituent unit represented by Formula (I) in the polymer, as calculated from the amounts of raw materials introduced and fed into the polymerization reactor, was 0.006 mmol/g-polymer per unit mass of the polymer.

Production Example 4

Synthesis of Polymer 4

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 11.0 mmol of bis(diethylamino)methylvinylsilane in cyclohexane and 14.3 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 11.0 mmol of 1-phenyl-2-pyrrolidone was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 4 was recovered from the polymer solution by steam stripping. Table 2 shows the evaluation results of Polymer 4. The content of the constituent unit represented by Formula (I) in the polymer, as calculated from the amounts of raw materials introduced and fed into the polymerization reactor, was 0.006 mmol/g-polymer per unit mass of the polymer.

Production Example 5

Synthesis of Polymer 5

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 14.9 mmol of n-butyllithium in n-hexane was introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 5 was recovered from the polymer solution by steam stripping. Table 2 shows the evaluation results of Polymer 5. Since no compound represented by Formula (IX) was used in the synthesis of Polymer 5, Polymer 5 contained no constituent unit represented by Formula (I).

TABLE 2

| | Polymer 3 | Polymer 4 | Polymer 5 |
|---|---|---|---|
| Styrene unit content (% by mass) | 25 | 24 | 24 |
| Vinyl bond content (mol %) | 57 | 57 | 58 |
| Molecular weight distribution (Mw/Mn) | 1.2 | 1.3 | 1.1 |

Production Example 6

Synthesis of Polymer 6

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 10.5 mmol of bis(diethylamino)methylvinylsilane in cyclohexane and 14.9 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 10.5 mmol of N-(3-dimethylaminopropyl) acrylamide was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 6 was recovered from the polymer solution by steam stripping. Table 3 shows the evaluation results of Polymer 6. The content of the constituent unit represented by Formula (I) in the polymer, as calculated from the amounts of raw materials introduced and fed into the polymerization reactor, was 0.006 mmol/g-polymer Per unit mass of the polymer.

Production Example 7

Synthesis of Polymer 7

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 10.5 mmol of bis(di(n-butyl)amino)methylvinylsilane in cyclohexane and 13.4 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 10.5 mmol of N-(3-dimethylaminopropyl) acrylamide was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 7 was recovered from the polymer solution by steam stripping. Table 3 shows the evaluation results of Polymer 7. The content of the constituent unit represented by Formula (I) in the polymer, as calculated from the amounts of raw materials introduced and fed into the polymerization reactor, was 0.006 mmol/g-polymer per unit mass of the polymer.

Production Example 8

Synthesis of Polymer 8

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 14.9 mmol of n-butyllithium in n-hexane was introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 8 was recovered from the polymer solution by steam stripping. Table 3 shows the evaluation results of Polymer 8. Since no compound represented by Formula (IX) was used in the synthesis of Polymer 8, Polymer 8 contained no constituent unit represented by Formula (I).

TABLE 3

| | Polymer 6 | Polymer 7 | Polymer 8 |
|---|---|---|---|
| Styrene unit content (% by mass) | 25 | 25 | 24 |
| Vinyl bond content (mol %) | 59 | 59 | 58 |
| Molecular weight distribution (Mw/Mn) | 1.2 | 1.3 | 1.1 |

Production Example 9

Synthesis of Polymer 9

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 16.0 mmol of bis(diethylamino)methylvinylsilane in cyclohexane and 18.5 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, the resulting polymer solution was stirred at a rate of 130 rpm, and 4.0 mmol of 1,3,5-tris(3-trimethoxysilylpropyl)isocyanurate was added and stirred for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 9 was recovered from the polymer solution by steam stripping. Table 4 shows the evaluation results of Polymer 9. The content of the constituent unit represented by Formula (I) in the polymer, as calculated from the amounts of raw materials introduced and fed into the polymerization reactor, was 0.009 mmol/g-polymer per unit mass of the polymer.

Production Example 10

Synthesis of Polymer 10

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 17.3 mmol of n-butyllithium in n-hexane was introduced, and the 1,3-butadiene and styrene were copolymerized for one hour. The polymerization was carried out with stirring at a rate of 130 rpm and a temperature within the polymerization reactor of 65° C. while the monomers were continuously fed into the polymerization reactor.

After the one hour polymerization, 14.4 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C.

After the 0.5-hour polymerization, 14.4 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C.

After the 0.5-hour polymerization, 14.4 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C. In the entire polymerization, the amount of 1,3-butadiene fed was 821 g, and the amount of styrene fed was 259 g.

Next, the resulting polymer solution was stirred at a rate of 130 rpm, and 3.6 mmol of 1,3,5-tris(3-trimethoxysilylpropyl)isocyanurate was added and stirred for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 10 was recovered from the polymer solution by steam stripping. Table 4 shows the evaluation results of Polymer 10. The content of the constituent unit represented by Formula (I) in the polymer, as calculated from the amounts of raw materials introduced and fed into the polymerization reactor, was 0.024 mmol/g-polymer per unit mass of the polymer.

Production Example 11

Synthesis of Polymer 11

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 14.9 mmol of n-butyllithium in n-hexane was introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 11 was recovered from the polymer solution by steam stripping. Table 4 shows the evaluation results of Polymer 11. Since no compound represented by Formula (IX) was used in the synthesis of Polymer 11, Polymer 11 contained no constituent unit represented by Formula (I).

TABLE 4

|  | Polymer 9 | Polymer 10 | Polymer 11 |
|---|---|---|---|
| Styrene unit content (% by mass) | 24 | 25 | 24 |
| Vinyl bond content (mol %) | 58 | 57 | 58 |
| Molecular weight distribution (Mw/Mn) | 1.2 | 1.3 | 1.1 |

Production Example 12

Synthesis of Polymer 12

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 11.5 mmol of bis(diethylamino)methylvinylsilane in cyclohexane and 14.1 mmol of n-butyllithium in n-hexane were introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor.

In the entire polymerization, the amount of 1,3-butadiene fed was 821 g, and the amount of styrene fed was 259 g.

Next, the resulting polymer solution was stirred at a rate of 130 rpm, and 11.5 mmol of N,N-dimethylformamide dimethyl acetal was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 12 was recovered from the polymer solution by steam stripping. Table 5 shows the evaluation results of Polymer 12. The content of the constituent unit represented by Formula (I) in the polymer, as calculated from the amounts of raw materials introduced and fed into the polymerization reactor, was 0.006 mmol/g-polymer per unit mass of the polymer.

Production Example 13

Synthesis of Polymer 13

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 14.1 mmol of n-butyllithium in n-hexane was introduced, and the 1,3-butadiene and styrene were copolymerized for one hour. The polymerization was carried out with stirring at a rate of 130 rpm and a temperature within the polymerization reactor of 65° C. while the monomers were continuously fed into the polymerization reactor.

After the one hour polymerization, 11.0 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C.

After the 0.5-hour polymerization, 11.0 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C.

After the 0.5-hour polymerization, 11.0 mmol of bis(diethylamino)methylvinylsilane in cyclohexane was introduced into the polymerization reactor with stirring at a rate of 130 rpm and a temperature within the polymerization reactor of 65° C.

Next, the monomers were continuously fed into the polymerization reactor and the 1,3-butadiene and styrene were copolymerized for 0.5 hours. The polymerization was carried out with stirring at a rate of 130 rpm and a temperature within the polymerization reactor of 65° C. In the entire polymerization, the amount of 1,3-butadiene fed was 821 g, and the amount of styrene fed was 259 g.

Next, the resulting polymer solution was stirred at a rate of 130 rpm, and 11.0 mmol of N,N-dimethylformamide dimethyl acetal was added and stirred for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 13 was recovered from the polymer solution by steam stripping. Table 5 shows the evaluation results of Polymer 13. The content of the constituent unit represented by Formula (I) in the polymer, as calculated from the amounts of raw materials introduced and fed into the polymerization reactor, was 0.018 mmol/g-polymer per unit mass of the Polymer.

Production Example 14

Synthesis of Polymer 14

The interior of a stainless steel polymerization reactor with a capacity of 20 L was washed, dried and purged with dry nitrogen. Then, 10.2 kg of hexane (specific gravity: 0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Subsequently, 14.9 mmol of n-butyllithium in n-hexane was introduced to initiate polymerization.

The 1,3-butadiene and styrene were copolymerized for 3 hours with stirring at a rate of 130 rpm and a temperature within the polymerization reactor of 65° C. while the monomers were continuously fed into the polymerization reactor. In the entire polymerization, the amount of 1,3-butadiene fed was 821 g, and the amount of styrene fed was 259 g.

Next, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 14 was recovered from the polymer solution by steam stripping. Table 5 shows the evaluation results of Polymer 14. Since no compound represented by Formula (IX) was used in the synthesis of Polymer 14, Polymer 14 contained no constituent unit represented by Formula (I).

TABLE 5

|  | Polymer 12 | Polymer 13 | Polymer 14 |
| --- | --- | --- | --- |
| Styrene unit content (% by mass) | 24 | 24 | 24 |
| Vinyl bond content (mol %) | 58 | 58 | 57 |
| Molecular weight distribution (Mw/Mn) | 1.2 | 1.3 | 1.1 |

The chemicals used in Examples and Comparative Examples are described below.

Natural rubber: RSS#3
Polybutadiene rubber: Ubepol BR150B produced by Ube Industries, Ltd.
Polymers 1 to 14: Polymers synthesized in Production Examples 1 to 14 above
Silica: Ultrasil VN3-G ($N_2SA$: 175 $m^2/g$) produced by Evonik Degussa
Silane coupling agent 1: NXT produced by GE Toshiba Silicone Co., Ltd. (a compound corresponding to a silane coupling agent represented by the above Formula (1) where p=2, q=3, and k=7)
Silane coupling agent 2: Si69 (bis(3-triethoxysilylpropyl) tetrasulfide) produced by Degussa
Carbon black: Diablack N339 ($N_2SA$: 96 $m^2/g$, DBP absorption: 124 mL/100 g) produced by Mitsubishi Chemical Corporation
Oil: X-140 produced by JX Nippon Oil & Energy Corporation
Antioxidant: Antigene 3C produced by Sumitomo Chemical Co., Ltd.
Stearic acid: Stearic acid beads "Tsubaki" produced by NOF Corporation
Zinc oxide: Zinc oxide #1 produced by Mitsui Mining & Smelting Co., Ltd.
Wax: Sunnoc N produced by Ouchi Shinko Chemical Industrial Co., Ltd.
Sulfur: Sulfur powder produced by Tsurumi Chemical Industry Co., Ltd.
Vulcanization accelerator 1: Soxinol CZ produced by Sumitomo Chemical Co., Ltd.
Vulcanization accelerator 2: Soxinol D produced by Sumitomo Chemical Co., Ltd.

EXAMPLES AND COMPARATIVE EXAMPLES

According to the formulations shown in Tables 6 to 10, the materials other than the sulfur and vulcanization accelerators were kneaded for 5 minutes at 150° C. using a 1.7-L Banbury mixer produced by Kobe Steel, Ltd., to give a kneadate. Then, the sulfur and vulcanization accelerators were added to the kneadate, and kneading was performed using an open roll mill for 5 minutes at 80° C. to give an unvulcanized rubber composition. The unvulcanized rubber composition was press-vulcanized for 20 minutes at 170° C. using a 0.5 mm-thick mold to give a vulcanized rubber composition.

Separately, the unvulcanized rubber composition was formed into the shape of a tread and assembled with other tire components on a tire building machine to build an unvulcanized tire. The unvulcanized tire was vulcanized for 12 minutes at 170° C. to prepare a test tire (size: 195/65R15).

The vulcanized rubber compositions and test tires thus prepared were evaluated by the aforementioned test methods. Tables 6 to 10 show the results and the averages of the three evaluations.

TABLE 6

| | | Example 1 | Example 2 | Comparative Example 1 | Comparative Example 2 | Comparative Example 3 |
|---|---|---|---|---|---|---|
| Formulation (parts by mass) | Natural rubber | 20 | 20 | 20 | 20 | 20 |
| | Polybutadiene rubber | 20 | 20 | 20 | 20 | 20 |
| | Polymer 1 | 60 | 20 | 60 | — | — |
| | Polymer 2 | — | 40 | — | 60 | 60 |
| | Silica | 75 | 75 | 75 | 75 | 75 |
| | Silane coupling agent 1 | 6 | 6 | — | 6 | — |
| | Silane coupling agent 2 | — | — | 6 | — | 6 |
| | Carbon black | 5 | 5 | 5 | 5 | 5 |
| | Oil | 20 | 20 | 20 | 20 | 20 |
| | Antioxidant | 1.5 | 1.5 | 1.5 | 1.5 | 1.5 |
| | Stearic acid | 2 | 2 | 2 | 2 | 2 |
| | Zinc oxide | 2.5 | 2.5 | 2.5 | 2.5 | 2.5 |
| | Wax | 1 | 1 | 1 | 1 | 1 |
| | Sulfur | 2 | 2 | 2 | 2 | 2 |
| | Vulcanization accelerator 1 | 1.8 | 1.8 | 1.8 | 1.8 | 1.8 |
| | Vulcanization accelerator 2 | 1.2 | 1.2 | 1.2 | 1.2 | 1.2 |
| Evaluation | tan δ (index) | 146 | 128 | 133 | 103 | 100 |
| | Rolling resistance (index) | 141 | 126 | 127 | 101 | 100 |
| | Wet-grip performance (index) | 139 | 125 | 134 | 101 | 100 |
| | Average | 142 | 126 | 131 | 102 | 100 |

TABLE 7

| | | Example 3 | Example 4 | Example 5 | Comparative Example 4 | Comparative Example 5 | Comparative Example 6 |
|---|---|---|---|---|---|---|---|
| Formulation (parts by mass) | Natural rubber | 20 | 20 | 20 | 20 | 20 | 20 |
| | Polybutadiene rubber | 20 | 20 | 20 | 20 | 20 | 20 |
| | Polymer 3 | 60 | — | 20 | 60 | — | — |
| | Polymer 4 | — | 60 | — | — | — | — |
| | Polymer 5 | — | — | 40 | — | 60 | 60 |
| | Silica | 75 | 75 | 75 | 75 | 75 | 75 |
| | Silane coupling agent 1 | 6 | 6 | 6 | — | 6 | — |
| | Silane coupling agent 2 | — | — | — | 6 | — | 6 |

TABLE 7-continued

|  |  | Example 3 | Example 4 | Example 5 | Comparative Example 4 | Comparative Example 5 | Comparative Example 6 |
|---|---|---|---|---|---|---|---|
|  | Carbon black | 5 | 5 | 5 | 5 | 5 | 5 |
|  | Oil | 20 | 20 | 20 | 20 | 20 | 20 |
|  | Antioxidant | 1.5 | 1.5 | 1.5 | 1.5 | 1.5 | 1.5 |
|  | Stearic acid | 2 | 2 | 2 | 2 | 2 | 2 |
|  | Zinc oxide | 2.5 | 2.5 | 2.5 | 2.5 | 2.5 | 2.5 |
|  | Wax | 1 | 1 | 1 | 1 | 1 | 1 |
|  | Sulfur | 2 | 2 | 2 | 2 | 2 | 2 |
|  | Vulcanization accelerator 1 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 |
| Evaluation | tan δ (index) | 139 | 141 | 121 | 128 | 103 | 100 |
|  | Rolling resistance (index) | 135 | 138 | 120 | 124 | 101 | 100 |
|  | Wet-grip performance (index) | 132 | 134 | 118 | 127 | 101 | 100 |
|  | Average | 135 | 138 | 120 | 126 | 102 | 100 |

TABLE 8

|  |  | Example 6 | Example 7 | Example 8 | Comparative Example 7 | Comparative Example 8 | Comparative Example 9 |
|---|---|---|---|---|---|---|---|
| Formulation (parts by mass) | Natural rubber | 20 | 20 | 20 | 20 | 20 | 20 |
|  | Polybutadiene rubber | 20 | 20 | 20 | 20 | 20 | 20 |
|  | Polymer 6 | 60 | — | 20 | 60 | — | — |
|  | Polymer 7 | — | 60 | — | — | — | — |
|  | Polymer 8 | — | — | 40 | — | 60 | 60 |
|  | Silica | 75 | 75 | 75 | 75 | 75 | 75 |
|  | Silane coupling agent 1 | 6 | 6 | 6 | — | 6 | — |
|  | Silane coupling agent 2 | — | — | — | 6 | — | 6 |
|  | Carbon black | 5 | 5 | 5 | 5 | 5 | 5 |
|  | Oil | 20 | 20 | 20 | 20 | 20 | 20 |
|  | Antioxidant | 1.5 | 1.5 | 1.5 | 1.5 | 1.5 | 1.5 |
|  | Stearic acid | 2 | 2 | 2 | 2 | 2 | 2 |
|  | Zinc oxide | 2.5 | 2.5 | 2.5 | 2.5 | 2.5 | 2.5 |
|  | Wax | 1 | 1 | 1 | 1 | 1 | 1 |
|  | Sulfur | 2 | 2 | 2 | 2 | 2 | 2 |
|  | Vulcanization accelerator 1 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 |
| Evaluation | tan δ (index) | 151 | 153 | 132 | 139 | 103 | 100 |
|  | Rolling resistance (index) | 147 | 150 | 130 | 135 | 101 | 100 |
|  | Wet-grip performance (index) | 144 | 146 | 128 | 138 | 101 | 100 |
|  | Average | 147 | 150 | 130 | 137 | 102 | 100 |

TABLE 9

|  |  | Example 9 | Example 10 | Example 11 | Comparative Example 10 | Comparative Example 11 | Comparative Example 12 |
|---|---|---|---|---|---|---|---|
| Formulation (parts by mass) | Natural rubber | 20 | 20 | 20 | 20 | 20 | 20 |
|  | Polybutadiene rubber | 20 | 20 | 20 | 20 | 20 | 20 |
|  | Polymer 9 | 60 | — | 20 | 60 | — | — |
|  | Polymer 10 | — | 60 | — | — | — | — |
|  | Polymer 11 | — | — | 40 | — | 60 | 60 |
|  | Silica | 75 | 75 | 75 | 75 | 75 | 75 |
|  | Silane coupling agent 1 | 6 | 6 | 6 | — | 6 | — |
|  | Silane coupling agent 2 | — | — | — | 6 | — | 6 |
|  | Carbon black | 5 | 5 | 5 | 5 | 5 | 5 |
|  | Oil | 20 | 20 | 20 | 20 | 20 | 20 |
|  | Antioxidant | 1.5 | 1.5 | 1.5 | 1.5 | 1.5 | 1.5 |
|  | Stearic acid | 2 | 2 | 2 | 2 | 2 | 2 |
|  | Zinc oxide | 2.5 | 2.5 | 2.5 | 2.5 | 2.5 | 2.5 |
|  | Wax | 1 | 1 | 1 | 1 | 1 | 1 |
|  | Sulfur | 2 | 2 | 2 | 2 | 2 | 2 |
|  | Vulcanization accelerator 1 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 |
| Evaluation | tan δ (index) | 134 | 136 | 117 | 124 | 103 | 100 |
|  | Rolling resistance (index) | 131 | 134 | 116 | 120 | 101 | 100 |
|  | Wet-grip performance (index) | 128 | 130 | 114 | 123 | 101 | 100 |
|  | Average | 131 | 133 | 116 | 122 | 102 | 100 |

TABLE 10

|  |  | Example 12 | Example 13 | Example 14 | Comparative Example 13 | Comparative Example 14 | Comparative Example 15 |
|---|---|---|---|---|---|---|---|
| Formulation (parts by mass) | Natural rubber | 20 | 20 | 20 | 20 | 20 | 20 |
|  | Polybutadiene rubber | 20 | 20 | 20 | 20 | 20 | 20 |
|  | Polymer 12 | 60 | — | 20 | 60 | — | — |
|  | Polymer 13 | — | 60 | — | — | — | — |
|  | Polymer 14 | — | — | 40 | — | 60 | 60 |
|  | Silica | 75 | 75 | 75 | 75 | 75 | 75 |
|  | Silane coupling agent 1 | 6 | 6 | 6 | — | 6 | — |
|  | Silane coupling agent 2 | — | — | — | 6 | — | 6 |
|  | Carbon black | 5 | 5 | 5 | 5 | 5 | 5 |
|  | Oil | 20 | 20 | 20 | 20 | 20 | 20 |
|  | Antioxidant | 1.5 | 1.5 | 1.5 | 1.5 | 1.5 | 1.5 |
|  | Stearic acid | 2 | 2 | 2 | 2 | 2 | 2 |
|  | Zinc oxide | 2.5 | 2.5 | 2.5 | 2.5 | 2.5 | 2.5 |
|  | Wax | 1 | 1 | 1 | 1 | 1 | 1 |
|  | Sulfur | 2 | 2 | 2 | 2 | 2 | 2 |
|  | Vulcanization accelerator 1 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 |
| Evaluation | tan δ (index) | 131 | 133 | 115 | 121 | 103 | 100 |
|  | Rolling resistance (index) | 128 | 131 | 113 | 117 | 101 | 100 |
|  | Wet-grip performance (index) | 125 | 127 | 111 | 120 | 101 | 100 |
|  | Average | 128 | 130 | 113 | 119 | 102 | 100 |

As shown in Tables 6 to 10, fuel economy and wet-grip performance were synergistically improved and a good balance of high levels of each of these properties was obtained in the rubber compositions of the examples which contained silica, a specific coupling agent, and a polymer (polymer 1, 3, 4, 6, 7, 9, 10, 12, or 13) containing a constituent unit based on a conjugated diene and a constituent unit represented by the above Formula (I) and having a terminal modified with a specific compound, as compared with the rubber compositions of the comparative examples.

The invention claimed is:

1. A pneumatic tire, provided with a tread formed from a rubber composition, the rubber composition comprising:
   a rubber component,
   silica, and
   a silane coupling agent represented by Formula (1) below,
   the rubber component comprising, based on 100% by mass of the rubber component, 5% to 90% by mass of a conjugated diene polymer containing a constituent unit based on a conjugated diene and a constituent unit represented by Formula (I) below, wherein at least one terminal of the polymer is modified with at least one compound selected from the group consisting of a compound represented by Formula (II) below, a compound containing a group represented by Formula (III) below, a compound represented by Formula (IV) below, a silicon compound containing at least one of a group represented by Formula (V) below or a group represented by Formula (VI) below, and a compound containing a group represented by Formula (VII) below,
   the rubber composition comprising the silica in an amount of 5 to 150 parts by mass relative to 100 parts by mass of the rubber component, and
   the rubber composition comprising the silane coupling agent represented by Formula (1) in an amount of 2 to 20 parts by mass relative to 100 parts by mass of silica

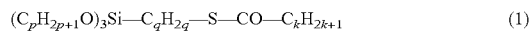

wherein p represents an integer of 1 to 3; q represents an integer of 1 to 5; and k represents an integer of 5 to 12, and wherein Formulas (I) to (VII) are represented below:

wherein $X^1$, $X^2$, and $X^3$ each independently represent a group represented by Formula (Ia) below, a hydroxy group, a hydrocarbyl group, or a substituted hydrocarbyl group, and at least one of $X^1$, $X^2$, and $X^3$ is a hydroxy group or a group represented by the following Formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom,

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-containing functional group,

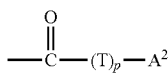 (III)

wherein p represents an integer of 0 or 1; T represents a $C_{1-20}$ hydrocarbylene group or a $C_{1-20}$ substituted hydrocarbylene group; and $A^2$ represents a nitrogen atom-containing functional group,

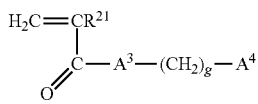 (IV)

wherein g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group containing at least one of a nitrogen atom or an oxygen atom,

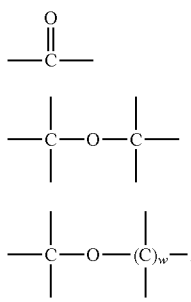

(V)

(VI)

(VII)

wherein w represents an integer of 1 to 11; and $A^5$ represents a nitrogen atom-containing functional group.

2. The pneumatic tire according to claim 1, wherein $R^1$ and $R^2$ in Formula (Ia) are $C_{1-6}$ hydrocarbyl groups.

3. The pneumatic tire according to claim 1, wherein two of $X^1$, $X^2$, and $X^3$ in Formula (I) are each a group represented by Formula (Ia) or a hydroxy group.

4. The pneumatic tire according to claim 1, wherein $A^1$ in Formula (II) is a group represented by the following Formula (IIa):

(IIa)

wherein $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

5. The pneumatic tire according to claim 1, wherein the group represented by Formula (III) is a group represented by the following Formula (IIIa):

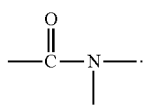 (IIIa)

6. The pneumatic tire according to claim 5, wherein the compound containing a group represented by Formula (III) is at least one compound selected from the group consisting of a compound represented by Formula (IIIa-1) below, a compound represented by Formula (IIIa-2) below, and a compound represented by Formula (IIIa-3) below,

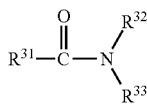 (IIIa-1)

wherein $R^{31}$ represents a hydrogen atom, a $C_{1-10}$ hydrocarbyl group, a $C_{1-10}$ substituted hydrocarbyl group, or a heterocyclic group containing at least one of a nitrogen atom or an oxygen atom as a heteroatom; and $R^{32}$ and $R^{33}$ each independently represent a $C_{1-10}$ group optionally containing at least one atom selected from the group consisting of a nitrogen atom, an oxygen atom, and a silicon atom, $R^{32}$ and $R^{33}$ may be bonded to each other to form a cyclic structure together with the nitrogen atom, and $R^{32}$ and $R^{33}$ may form a single group bonded to the nitrogen via a double bond,

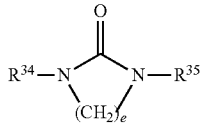 (IIIa-2)

wherein e represents an integer of 0 to 10; and $R^{34}$ and $R^{35}$ each independently represent a $C_{1-20}$ hydrocarbyl group or a $C_{1-20}$ substituted hydrocarbyl group,

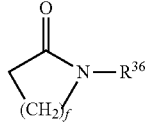 (III-3)

wherein f represents an integer of 0 to 10; and $R^{36}$ represents a $C_{1-20}$ hydrocarbyl group or a $C_{1-20}$ substituted hydrocarbyl group.

7. The pneumatic tire according to claim 1, wherein the compound containing a group represented by Formula (III) is a compound represented by the following Formula (IIIb-1):

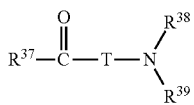 (IIIb-1)

wherein $R^{37}$ represents a hydrogen atom, a $C_{1-10}$ hydrocarbyl group, a $C_{1-10}$ substituted hydrocarbyl group, or a heterocyclic group containing at least one of a nitrogen atom or an oxygen atom as a heteroatom; $R^{38}$ and $R^{39}$ each independently represent a $C_{1-10}$ group optionally containing at least one atom selected from the group consisting of a nitrogen atom, an oxygen atom, and a silicon atom, $R^{38}$ and $R^{39}$ may be bonded to each other to form a cyclic structure together with the nitrogen atom, and $R^{38}$ and $R^{39}$ may form a single group bonded to the nitrogen via a double bond; and T represents a $C_{1-20}$ hydrocarbylene group or a $C_{1-20}$ substituted hydrocarbylene group.

8. The pneumatic tire according to claim 7, wherein the compound represented by Formula (IIIb-1) is at least one compound selected from the group consisting of a compound represented by Formula (IIIb-1-1) below and a compound represented by Formula (IIIb-1-2) below,

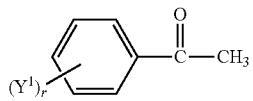

(IIIb-1-1)

wherein r represents an integer of 1 or 2; and $Y^1$ represents a nitrogen atom-containing functional group that is a substituent on the benzene ring, and when plural $Y^1$ groups are present, the plural $Y^1$ groups may be the same as or different from one another,

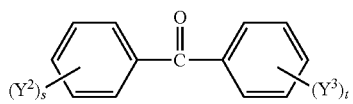

(IIIb-1-2)

wherein s represents an integer of 1 or 2; t represents an integer of 0 to 2; and $Y^2$ and $Y^3$ each represent a nitrogen atom-containing functional group that is a substituent on the benzene ring, and when plural $Y^2$ groups are present, the plural $Y^2$ groups may be the same as or different from one another, and when plural $Y^3$ groups are present, the plural $Y^3$ groups may be the same as or different from one another.

9. The pneumatic tire according to claim 1, wherein $A^4$ in Formula (IV) is a hydroxy group or a group represented by the following Formula (IVa):

(IVa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

10. The pneumatic tire according to claim 1, wherein the silicon compound contains a group represented by the following Formula (VIII):

(VIII)

wherein $R^{41}$, $R^{42}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ is a hydrocarbyloxy group.

11. The pneumatic tire according to claim 1, wherein the silicon compound contains a group represented by the following Formula (Va):

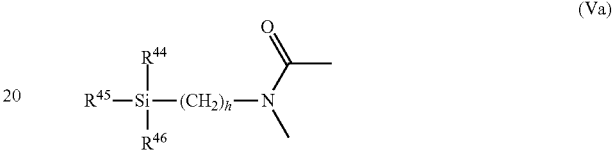

(Va)

wherein h represents an integer of 1 to 10; and $R^{44}$, $R^{45}$, and $R^{46}$ each independently represent a $C_{1-4}$ hydrocarbyl group or a $C_{1-4}$ hydrocarbyloxy group, and at least one of $R^{44}$, $R^{45}$, and $R^{46}$ is a hydrocarbyloxy group.

12. The pneumatic tire according to claim 1, wherein the compound containing a group represented by Formula (VII) is a compound represented by the following Formula (VII-1):

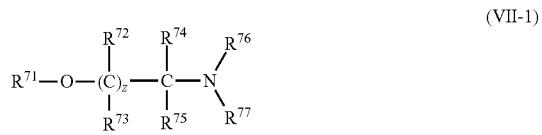

(VII-1)

wherein z represents an integer of 0 to 10; $R^{71}$ represents a $C_{1-5}$ hydrocarbyl group; $R^{72}$, $R^{73}$, $R^{74}$ and $R^{75}$ each independently represent a hydrogen atom, a $C_{1-5}$ hydrocarbyl group, a $C_{1-5}$ substituted hydrocarbyl group, or a $C_{1-5}$ hydrocarbyloxy group, and when plural $R^{72}$ groups and plural $R^{73}$ groups are present, the plural $R^{72}$ groups and the plural $R^{73}$ groups may be the same as or different from one another; and $R^{76}$ and $R^{77}$ each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

13. The pneumatic tire according to claim 12, wherein one of $R^{74}$ and $R^{75}$ in Formula (VII-1) is a hydrogen atom.

14. The pneumatic tire according to claim 1, wherein the conjugated diene polymer has a vinyl bond content of at least 10 mol % but not more than 80 mol % per 100 mol % of the constituent unit based on a conjugated diene.

15. The pneumatic tire according to claim 1, wherein the rubber component comprises at least one of natural rubber or polybutadiene rubber.

16. The pneumatic tire according to claim 1, wherein the silica has a nitrogen adsorption specific surface area of 40 to 400 m$^2$/g.

17. The pneumatic tire according to claim 1, wherein the rubber component comprises 10 to 30% by mass of natural rubber, 10 to 30% by mass of polybutadiene rubber and 30 to 80% by mass of the conjugated diene polymer; and wherein the silica is present in an amount of 45 to 100 parts by mass relative to 100 parts by mass of the rubber component.

18. The pneumatic tire according to claim 1, wherein the rubber component comprises 10 to 30% by mass of natural rubber, 10 to 30% by mass of polybutadiene rubber and 30 to 80% by mass of the conjugated diene polymer.

* * * * *